United States Patent
Onuma

(10) Patent No.: US 10,538,212 B2
(45) Date of Patent: Jan. 21, 2020

(54) VEHICLE SEAT

(71) Applicant: TS TECH CO., LTD., Asaka-shi, Saitama (JP)

(72) Inventor: Koji Onuma, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 28 days.

(21) Appl. No.: 15/919,490

(22) Filed: Mar. 13, 2018

(65) Prior Publication Data

US 2018/0272969 A1    Sep. 27, 2018

(30) Foreign Application Priority Data

Mar. 24, 2017  (JP) .................................. 2017-058942

(51) Int. Cl.
    *B60N 2/00*      (2006.01)
    *B60R 16/037*   (2006.01)
    (Continued)

(52) U.S. Cl.
    CPC ............ *B60R 16/037* (2013.01); *B60N 2/002* (2013.01); *B60N 2/68* (2013.01); *B60R 16/0215* (2013.01); *B60R 16/03* (2013.01)

(58) Field of Classification Search
    CPC ... B60R 16/037; B60R 16/0215; B60R 16/03; B60N 2/002; B60N 2/5635; B60N 2/68; B60N 2/7094; B60N 2002/0264
    (Continued)

(56) References Cited

U.S. PATENT DOCUMENTS 4,050,738 A * 9/1977 Griffiths .................... A47C 7/32
                                              297/452.52
4,147,336 A * 4/1979 Yamawaki ........... B60N 2/7041
                                                  267/111

(Continued)

FOREIGN PATENT DOCUMENTS

JP        S54151703 U    10/1979
JP        S5749416 A     3/1982

(Continued)

OTHER PUBLICATIONS

U.S. Appl. No. 15/812,530, filed Nov. 14, 2017.
(Continued)

*Primary Examiner* — Mark R Wendell
(74) *Attorney, Agent, or Firm* — Hamre, Schumann, Mueller & Larson, P.C.

(57) ABSTRACT

A vehicle seat comprises: a pair of opposed frames disposed opposite to and separately from each other; a pair of connecting frames disposed separately from each other in a perpendicular direction perpendicular to an opposing direction of the pair of opposed frames, the connecting frames being configured to connect the pair of opposed frames; a bridging wire disposed to bridge the pair of connecting frames; a reinforcing wire disposed to cross the bridging wire as viewed from an occupant side; and a plate-shaped plastic member configured to cover the bridging wire and the reinforcing wire at least at their crossover such that the bridging wire and the reinforcing wire are arranged to be spaced apart from and thus kept out of contact with each other, the bridging wire and the reinforcing wire being connected with the plate-shaped plastic member.

19 Claims, 14 Drawing Sheets

(51) Int. Cl.
  *B60N 2/68* (2006.01)
  *B60R 16/02* (2006.01)
  *B60R 16/03* (2006.01)
(58) Field of Classification Search
  USPC .................................................. 297/452.18
  See application file for complete search history.

(56) References Cited

U.S. PATENT DOCUMENTS

| | | | |
|---|---|---|---|
| 4,435,014 A | 3/1984 | Gilardi | |
| 5,823,620 A * | 10/1998 | Le Caz | B60N 2/6671 |
| | | | 297/284.4 |
| 5,927,817 A | 7/1999 | Ekman et al. | |
| 6,412,874 B1 | 7/2002 | Mayer | |
| 8,020,932 B2 | 9/2011 | Yamada et al. | |
| 8,662,483 B2 | 3/2014 | Yamaguchi et al. | |
| 8,939,504 B2 | 1/2015 | Abe et al. | |
| 9,718,383 B2 | 8/2017 | Matsui | |
| 10,300,821 B2 | 5/2019 | Misono et al. | |
| 2003/0102699 A1 | 6/2003 | Aoki et al. | |
| 2004/0155501 A1* | 8/2004 | McMillen | B60N 2/20 |
| | | | 297/284.4 |
| 2005/0173957 A1* | 8/2005 | Schwarzbich | B60N 2/66 |
| | | | 297/284.4 |
| 2010/0007188 A1 | 1/2010 | Yamada et al. | |
| 2010/0045079 A1 | 2/2010 | Andersson et al. | |
| 2010/0237669 A1* | 9/2010 | Kruger | B60N 2/4221 |
| | | | 297/216.1 |
| 2011/0248534 A1* | 10/2011 | Pinto Ribeiro | B60N 2/002 |
| | | | 297/217.1 |
| 2013/0088064 A1 | 4/2013 | Axakov et al. | |
| 2013/0270878 A1* | 10/2013 | Adachi | B60N 2/4228 |
| | | | 297/216.14 |
| 2015/0232008 A1* | 8/2015 | Zimmerbeutel | B60N 2/682 |
| | | | 297/452.11 |
| 2015/0306998 A1 | 10/2015 | Matsui | |
| 2015/0307010 A1 | 10/2015 | Nakagawa et al. | |
| 2015/0343932 A1* | 12/2015 | Hosoe | B60N 2/7094 |
| | | | 297/452.52 |
| 2016/0052437 A1 | 2/2016 | Hoshi | |
| 2016/0245309 A1 | 8/2016 | Helmenstein | |
| 2017/0028885 A1 | 2/2017 | Bauer | |
| 2017/0036575 A1* | 2/2017 | Kobayashi | B60N 2/68 |
| 2017/0267147 A1* | 9/2017 | Line | B60N 2/62 |
| 2018/0105083 A1 | 4/2018 | Tsuzaki et al. | |
| 2018/0118068 A1 | 5/2018 | Onuma et al. | |
| 2018/0272909 A1 | 9/2018 | Misono et al. | |

FOREIGN PATENT DOCUMENTS

| | | |
|---|---|---|
| JP | H0254445 U | 4/1990 |
| JP | 2003165325 A | 6/2003 |
| JP | 2005152482 A | 6/2005 |
| JP | 3137036 U | 11/2007 |
| JP | 2008079793 | 4/2008 |
| JP | 2009178450 A | 8/2009 |
| JP | 2012197032 A | 10/2012 |
| JP | 2013100107 A | 5/2013 |
| JP | 5435764 | 3/2014 |
| JP | 2014162431 A | 9/2014 |
| JP | 2014223836 A | 12/2014 |
| JP | 2015003576 A | 1/2015 |
| JP | 2015067151 A | 4/2015 |
| JP | 2015209086 | 11/2015 |
| JP | 2016117406 A | 6/2016 |
| WO | 2015156218 A1 | 10/2015 |

OTHER PUBLICATIONS

U.S. Appl. No. 15/920,869, filed Mar. 14, 2018.
Office Action issued for Japanese Patent Application No. 2017-058965, dispatch date Feb. 5, 2019, 6 pages including English translation.
International Search Report and Written Opinion issued for International Patent Application No. PCT/JP2017/031908 dated Oct. 17, 2017, 19 pages including English translation.
International Search Report and Written Opinion issued for International Patent Application No. PCT/JP2017/046918 dated Apr. 10, 2018, 15 pages including English translation.
International Search Report and Written Opinion issued for International Patent Application No. PCT/JP2017/046919 dated Oct. 17, 2017, 10 pages including English translation.
Office Action issued for Japanese Patent Application No. 2017-058942, dated Nov. 13, 2018, 5 pages including English translation.

* cited by examiner

FIG.9
(a)
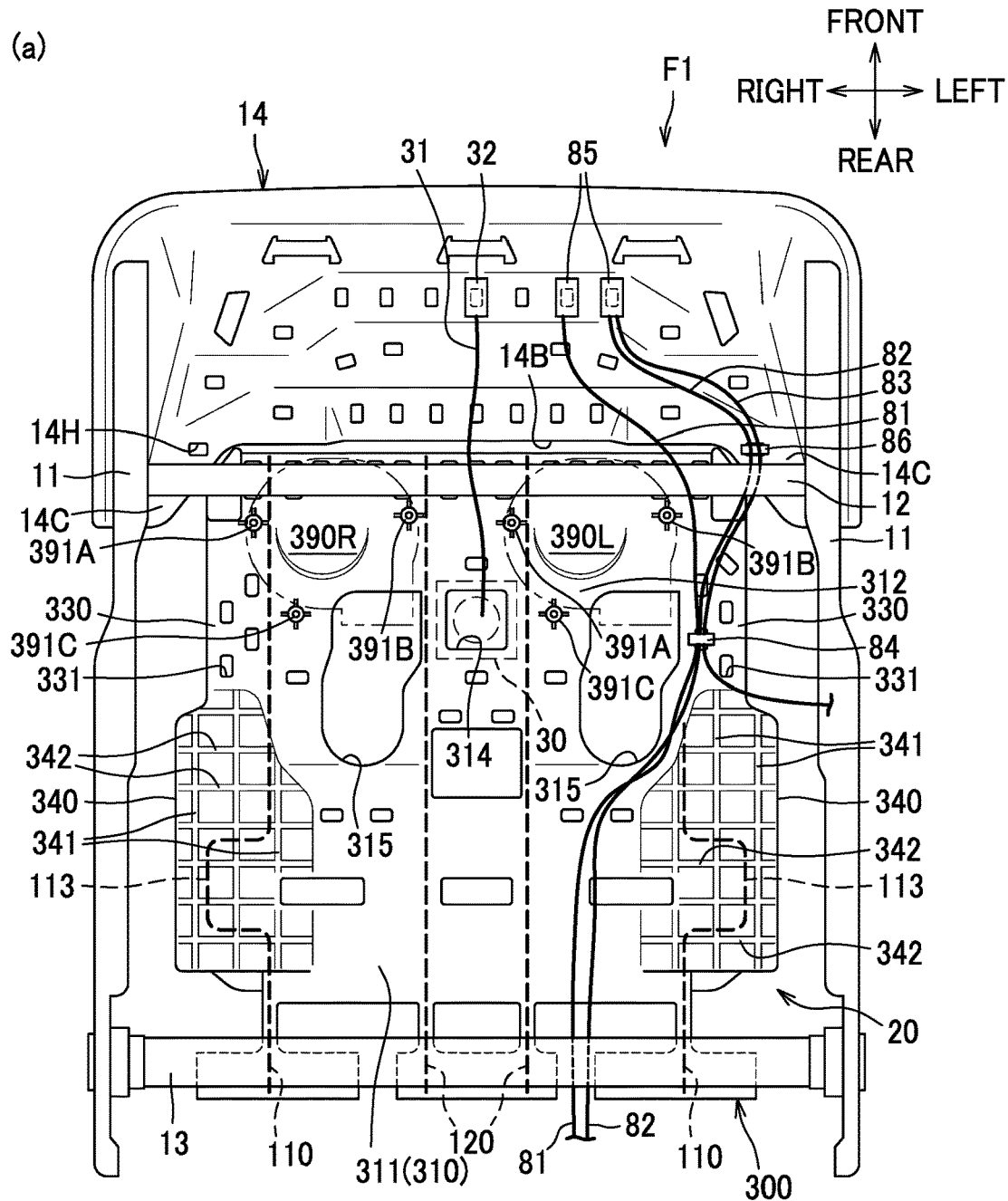
(b)
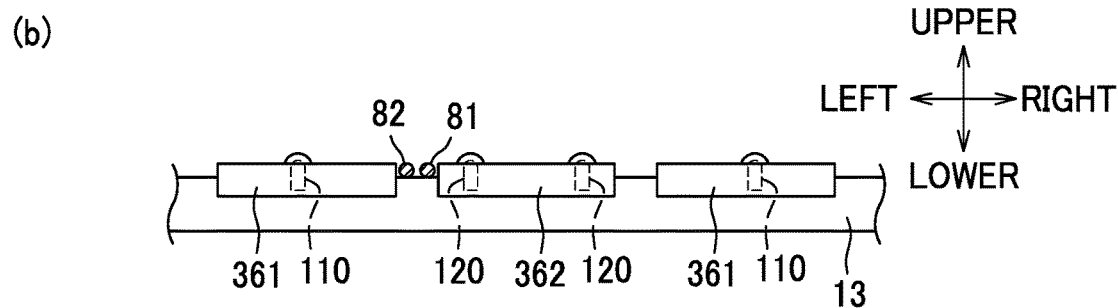

VEHICLE SEAT

CROSS-REFERENCE TO RELATED APPLICATION(S)

This application claims priority from Japanese Patent Application No. 2017-058942 filed on Mar. 24, 2017, the disclosure of which is incorporated herein by reference in its entirety.

BACKGROUND

1. Field

The present invention relates to a vehicle seat with a comfortable feel of seating for a person seated on the seat.

2. Description of Related Art

For example, JP 2014-162431 A discloses a vehicle seat including a frame-like cushion frame, two front and rear wires by which a front panel and a rear pipe of a cushion frame are bridged, a central wire and a crossing wire arranged to cross these two front and rear wires. In this technique, the wires arranged inside the cushion frame function as members for receiving a load from an occupant seated on the vehicle seat through a cushion pad.

SUMMARY

It is desirable for a member configured to receive a load from the occupant (hereinafter referred to as a "support member") to provide a comfortable feel of seating for a person seated on the seat.

It is an object of the present invention to provide a vehicle seat in which the feel of seating can be made more comfortable.

It is another object of the present invention to increase rigidity of the support member.

It is yet another object of the present invention to increase rigidity in a mounting structure for a sensor.

It is yet another object of the present invention to form a hole for use in mounting another member with ease.

It is yet another object of the present invention to prevent the support member from having an undesirably complicated structure.

In order to achieve any of the above-mentioned objects, a vehicle seat according to the present invention comprises: a pair of opposed frames disposed opposite to and separately from each other; a pair of connecting frames disposed separately from each other in a perpendicular direction perpendicular to an opposing direction of the pair of opposed frames, the connecting frames being configured to connect the pair of opposed frames; a bridging wire disposed to bridge the pair of connecting frames; a reinforcing wire disposed to cross the bridging wire as viewed from an occupant side; and a plate-shaped plastic member configured to cover the bridging wire and the reinforcing wire at least at their crossover such that the bridging wire and the reinforcing wire are arranged to be spaced apart from and thus kept out of contact with each other, the bridging wire and the reinforcing wire being connected with the plate-shaped plastic member.

With this configuration, the support member can be made up of the bridging wire, the reinforcing wire, and the plate-shaped plastic member with which the bridging wire and the reinforcing wire are covered. As a result, the load from the occupant can be received by a surface having an effective bearing area. In addition, the support member can be designed to have an adequate flexibility so as to be more appropriate in comparison with an alternative configuration in which the support member is made of metal plate. Furthermore, the plate-shaped plastic member can be reinforced by the bridging wire and the reinforcing wire, and thus the support member can be designed to have an adequate rigidity. With these features, the feel of seating for an occupant seated on the seat can be made more comfortable.

The vehicle seat as described above may be configured such that one of the bridging wire and the reinforcing wire comprises a second portion crossing a first portion of another of the bridging wire and the reinforcing wire, and a third portion bent from the second portion and extending toward one end of the first portion, that the plastic member includes a first covering portion with which the first portion is covered, a second covering portion with which the third portion is covered, and a connecting portion by which the first covering portion and the second covering portion are connected, and that the third portion is nonparallel to the first portion.

With this configuration, in comparison with an alternative configuration in which the third portion is parallel to the first portion, the first covering portion and the second covering portion which are connected by the connecting portion are rendered unlikely to rotate relative to each other, so that the plastic member can be enhanced in rigidity. Accordingly, the support member can be enhanced in rigidity.

The vehicle seat as described above may be configured such that the plastic member includes: a wire covering portion with which one of the bridging wire and the reinforcing wire is covered, the wire covering portion protruding on the occupant side or a side opposite to the occupant side; and a rib protruding on a same side as a side on which the wire covering portion protrudes, and that the rib is connected to the wire covering portion.

With this configuration, the plastic member can be enhanced in rigidity, and the support member can thus be enhanced in rigidity.

The vehicle seat as described above may be configured such that the rib includes a first rib having one end connected to a portion of the wire covering portion which protrudes on the occupant side, an amount of protrusion of the first rib gradually decreasing toward another end of the first rib.

With this configuration, a touch of something stepped which would be produced by provision of the first rib can be reduced, so that the feel of seating for an occupant seated on the seat can be made more comfortable.

The vehicle seat as described above may be configured such that the wire covering portion includes a bridging wire covering portion with which the bridging wire is covered, and a reinforcing wire covering portion with which the reinforcing wire is covered, and that the rib includes a second rib having one end connected to the bridging wire covering portion and another end connected to the reinforcing wire covering portion.

With this configuration, the plastic member can be further enhanced in rigidity, and the support member can thus be further enhanced in rigidity.

The vehicle seat as described above may be configured to further comprise a seating sensor for detecting seating of the occupant on the vehicle seat, wherein the bridging wire is provided at plural positions and arranged side by side in the opposing direction, and wherein the seating sensor is disposed between adjacent bridging wires.

With this configuration, the seating sensor is disposed between the rigidity-enhanced portions, of the plastic member, reinforced by the adjacent bridging wires, so that the rigidity in the mounting structure for the seating sensor can be enhanced.

The vehicle seat as described above may be configured such that the plastic member has a mounting hole for use in mounting another member, in a position clear of a portion which covers the bridging wire or the reinforcing wire.

With this configuration, the mounting hole can be formed in the plastic member with ease. Further, as a structure for mounting another member, for example, in comparison with an alternative configuration in which a claw-shaped portion or the like adapted to engage with the another member is formed in the plastic member, the support member can be prevented from having an undesirably complicated structure.

The vehicle seat as described above may be configured such that at least one of the bridging wire and the reinforcing wire includes: a first parallel portion and a second parallel portion each disposed parallel to one straight line; and a bent portion disposed between the first parallel portion and the second parallel portion, the bent portion being bent so as to swerve off the straight line, and that the plastic member includes a bent portion covering portion with which the bent portion is covered, and a thick portion connecting an end of the bent portion covering portion closer to the first parallel portion and an end of the bent portion covering portion closer to the second parallel portion.

With this configuration, the plastic member can be enhanced in rigidity, and the support member can thus be enhanced in rigidity.

The vehicle seat as described above may be configured to further comprise a seating sensor for detecting seating of the occupant on the vehicle seat, wherein the seating sensor is disposed inside an area surrounded by the bent portion covering portion and the thick portion.

With this configuration, the seating sensor is located inside the high-rigidity portion, of the plastic member, reinforced by the bridging wire and the thick portion, so that the rigidity in the attachment structure for the seating sensor can be increased.

BRIEF DESCRIPTION OF DRAWINGS

FIG. 9 includes (a) a bottom view and (b) a rear view of the cushion frame and the support member.

DESCRIPTION OF EMBODIMENT(S)

Hereafter, one embodiment of the present invention will be described with reference to the accompanying drawings. In the following description, the front/rear (frontward/rearward), left/right (leftward/rightward; lateral) and upper/lower (upward/downward; vertical) directions will be designated with reference to a person (occupant) seated on the seat.

Figure 1:
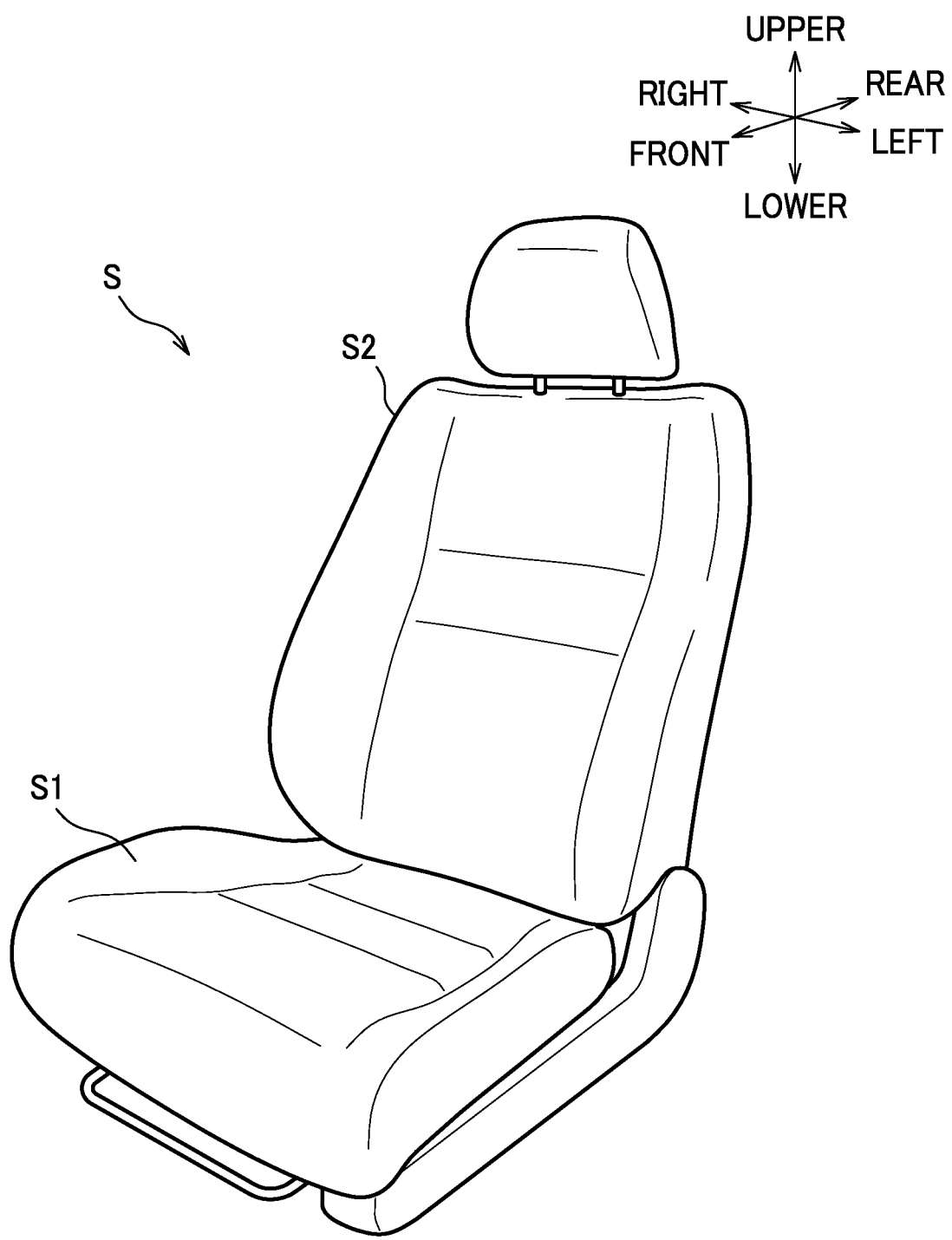
FIG. 1 is a diagram showing a car seat as a vehicle seat according to an embodiment.

As shown in FIG. 1, the vehicle seat in the present embodiment is configured as a car seat S for use in a driver's seat, a passenger seat, or the like, such as to be installed in an automobile, and mainly includes a seat cushion S1 and a seat back S2.

Figure 2:
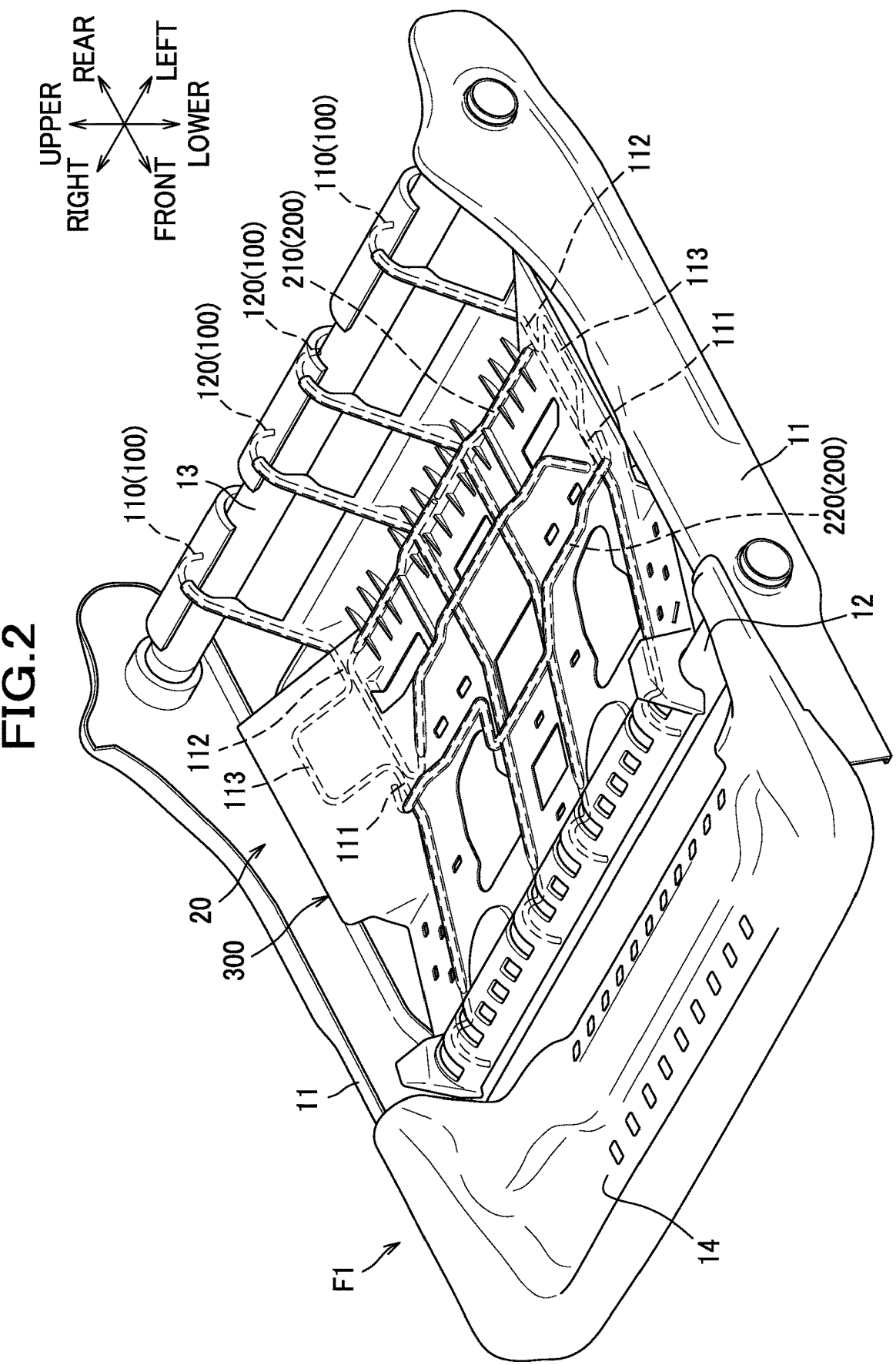
FIG. 2 is a diagram showing a cushion frame and a support member.

Inside the seat cushion S1, a cushion frame F1 (as an example of a frame member) as shown in FIG. 2 is incorporated, and constitutes a frame of the seat cushion S1. The seat cushion S1 is configured to have the cushion frame F1 upholstered with a pad material made of urethane foam or the like and an outer covering material made of fabrics, leather or the like. Although not shown in the drawing, the seat back S2 includes a back frame that constitutes a frame of the seat back S2, and is configured to have the back frame upholstered with a pad material and an outer covering material.

The cushion frame F1 includes left and right side frames 11 as a pair of opposed frames, a front frame 12 as a first connecting frame, a rear frame 13 as a second connecting frame, and a pan frame 14 as a restriction frame. In the present embodiment, the lateral direction corresponds to "opposing direction of the pair of opposed frames", and the front-rear direction corresponds to "perpendicular direction perpendicular to the opposing direction (lateral direction) of the pair of opposed frames". Also, in the present embodiment, the upper side corresponds to "occupant side", and the lower side thus corresponds to "a side opposite to an occupant side".

The left and right side frames 11 are elongate frames elongate in the front-rear direction and are disposed opposite to and separately from each other in the lateral direction. Each side frame 11 is made of sheet metal, and a portion adjacent to a peripheral edge thereof is so shaped as to extend laterally inward in cross section.

The front frame 12 and the rear frame 13 are disposed opposite to and separately from each other in the front-rear direction, and constitute a pair of connecting frames by which the left and right side frames 11 are connected. To be more specific, the front frame 12 and the rear frame 13 are made of metal pipe workpieces, and the front frame 12 connects front portions of the left and right side frames 11. The rear frame 13 is disposed rearwardly separately from the front frame 12, and connects rear portions of the left and right side frames 11.

The pan frame 14 is another connecting frame by which the left and right side frames 11 are connected, and is made of sheet metal. The pan frame 14 is disposed to connect front end portions of the left and right side frames 11.

A plate-shaped support member 20 is disposed at an inner side of the cushion frame F1 shaped like a picture frame, in other words, between the left and right side frames 11. The support member 20 is a member configured to receive a load from an occupant through a pad material (not shown) of the seat cushion S1, and includes bridging wires 100, reinforcing wires 200, and a plate-shaped plastic member 300. The bridging wires 100 and the reinforcing wires 200 are wires, of which a detailed description will be given later, disposed between the left and right side frames 11. The bridging wires 100 and the reinforcing wires 200 are wires made of metal. The plastic member 300 is made of plastic, and so formed as to cover the bridging wires 100 and the reinforcing wires 200 through insert molding process or the like by which these wires are integrated with the plastic member 300.

As shown in FIG. 3(a), the bridging wires 100 are arranged to bridge the front frame 12 and the rear frame 13. In the present embodiment, a plurality of bridging wires 100 are arranged in the lateral direction. To be more specific, the bridging wires 100 include left and right first longitudinal wires 110 as left and right first bridging wires, and two second longitudinal wires 120 as second bridging wires.

The left and right first longitudinal wires 110 are disposed separately from each other in the lateral direction, and each include a front extension portion 111 and a rear extension portion 112 as an extension portion, a bent portion 113, a front inclined portion 114, a front hooked portion 115, a rear inclined portion 116, and a rear hooked portion 117.

The front extension portion 111 and the rear extension portion 112 extend substantially in the front-rear direction. In the present embodiment, the front extension portion 111 may be referred to as "first extension portion", and the rear extension portion 112 may be referred to as "second extension portion".

The front inclined portion 114 extends from a front end of the front extension portion 111 in an obliquely-frontward-and-upward direction, and the rear inclined portion 116 extends from a rear end of the rear extension portion 112 in an obliquely-rearward-and-upward direction.

The front hooked portion 115 is a portion to be hooked on the front frame 12, and extends out from a front end of the front inclined portion 114 substantially in a shape of an upwardly convexed segment of a circle. The rear hooked portion 117 is a portion to be hooked on the rear frame 13, and extends out from an upper end of the rear inclined portion 116 substantially in a shape of a segment of a circle.

Figure 6:
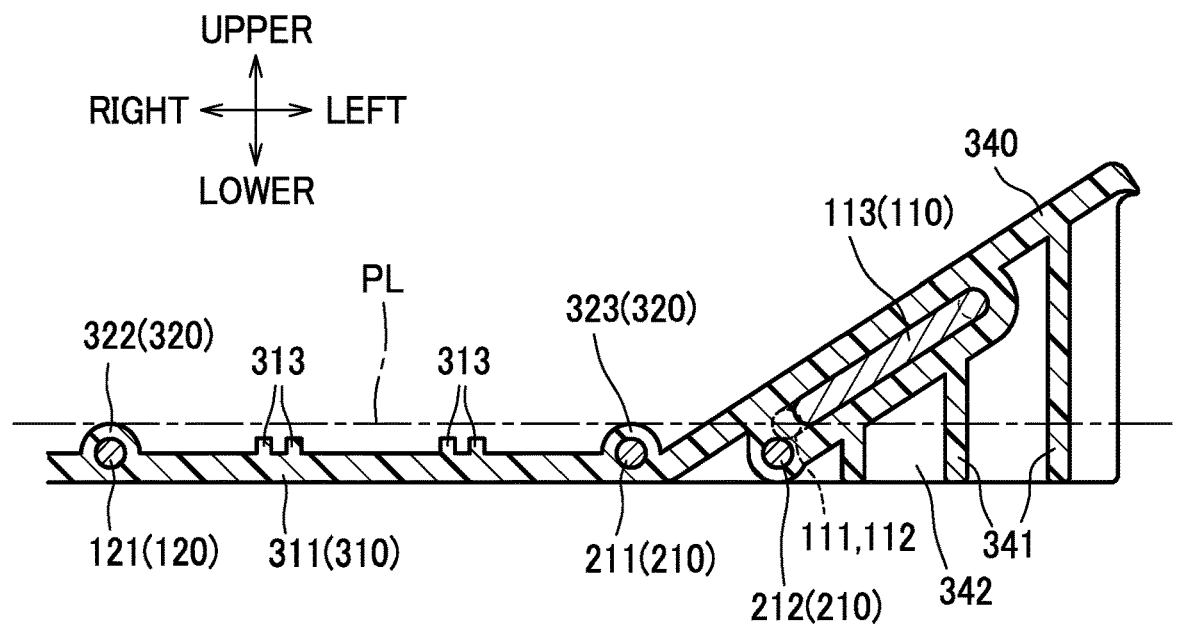
FIG. 6 is a sectional view taken along the line V-V of FIG. 5.

The bent portion 113 is formed between the front extension portion 111 and the rear extension portion 112 in the front-rear direction, and so bent as to protrude laterally outward, in a substantially U-shaped configuration, relative to the front and rear extension portions 111, 112. As shown in FIG. 6, the bent portion 113 is located above a plane PL extending through the extension portions 111, 112 of the left and right first longitudinal wires 110. In other words, the bent portion 113 is so formed as to protrude in an obliquely-laterally-outward-and-upward direction relative to the front and rear extension portions 111, 112. As shown in FIG. 3(a), the front extension portion 111 extends substantially frontward from one of laterally inner ends (i.e., the front end) of the bent portion 113, while the rear extension portion 112 extends substantially rearward from the other of the laterally inner ends (i.e., the rear end) of the bent portion 113.

The second longitudinal wires 120 are arranged side by side between the left and right first longitudinal wires 110, and each include an extension portion 121, a front inclined portion 124, a front hooked portion 125, a rear inclined portion 126, and a rear hooked portion 127.

The extension portion 121 extends in a substantially front-rear direction, and arranged substantially parallel to the front and rear extension portions 111, 112 of the left and right first longitudinal wires 110.

The front inclined portion 124 and the front hooked portion 125 are formed to have substantially the same shapes as those of the front inclined portion 114 and the front hooked portion 115 of the first longitudinal wire 110, whereas the rear inclined portion 126 and the rear hooked portion 127 are formed to have substantially the same shapes as those of the rear inclined portion 116 and the rear hooked portion 117 of the first longitudinal wire 110. In the present embodiment, the front hooked portions 115, 125 of the longitudinal wires 110, 120 may be referred to as "hooked portion formed in the bridging wire".

The reinforcing wires 200 are so arranged as to cross the bridging wires 100 (first longitudinal wires 110 and second longitudinal wires 120) as viewed from above. In the present embodiment, there are a plurality of reinforcing wires 200 arranged in the front-rear direction. To be more specific, the reinforcing wires 200 include a first transverse wire 210 and a second transverse wire 220 disposed in front of the first transverse wire 210.

The first transverse wire 210 consists of a single wire, and includes a first wire portion 211 and left and right first support portions 212 as a first reinforcing wire, and left and right second wire portions 213 as a second reinforcing wire. The first wire portion 211 and the second wire portion 213 are so arranged as to cross the extension portions 121 of the second longitudinal wires 120.

Figure 5:
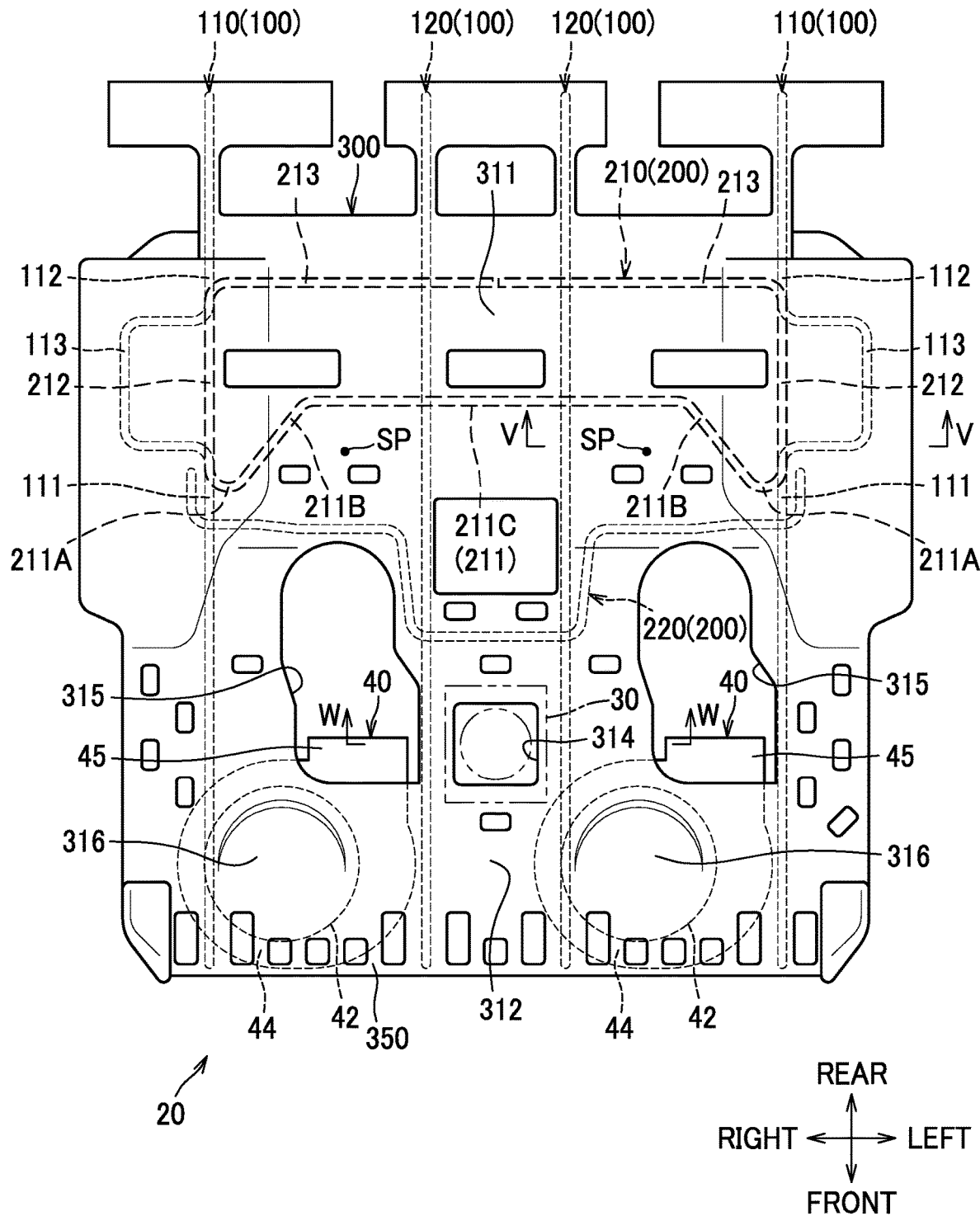
FIG. 5 is a top view showing the support member.

The first wire portion 211 extends in the lateral direction. As shown in FIG. 5, the first wire portion 211 runs to detour around sciatic positions SP corresponding to ischial regions of an occupant, and is partly located on the rear side of the sciatic positions SP. To be more specific, the first wire portion 211 includes left and right end portions 211A, intermediate portions 211B extending from laterally inner ends of the respective end portions 211A and (as the first wire portion 211 is bent at these end portions) directed in obliquely-laterally-inward-and-rearward directions, and a center portion 211C extending in the lateral direction and connecting rear ends of the left and right intermediate portions 211B. The center portion 211C is located on the rear side with respect to the sciatic positions SP. On the other hand, the left and right end portions 211A are located on the front side with respect to the sciatic positions SP. It is to be understood that the left and right end portions 211A may be located in the same front-rear position as those of the sciatic positions SP. In this description, the sciatic positions SP are positions corresponding to the lowermost portions of the ischial regions of the occupant.

The first support portions 212 extend rearward from left and right ends (i.e., laterally outer ends of the respective end portions 211A) of the first wire portion 211 and (as the first support portions 212 are bent rearward from these end portions) are directed substantially in the front-rear direction. Each of the first support portions 212 extends along the front extension portion 111 and the rear extension portion 112 of a corresponding first longitudinal wire 110 substantially in the front-rear direction, and is located under the front extension portion 111 and the rear extension portion 112. With this arrangement, the first support portion 212 serves to support the front extension portion 111 and the rear extension portion 112 of the first longitudinal wire 110 from below through the plastic member 300, and further to support the bent portion 113 from below through the front extension portion 111 an the rear extension portion 112. As shown in FIG. 3(a), the first transverse wire 210 is so arranged that portions of the first transverse wire 210 which cross the first longitudinal wires 110 (i.e., the first support portions 212) are located under the front and rear extension portions 111, 112 of the first longitudinal wires 110 while portions of the first transverse wire 210 which cross the second longitudinal wires 120 are located over the second longitudinal wires 120. To be more specific, the first transverse wire 210 is configured such that the center portion 211C of the first wire portion 211 and the laterally inner end portions of the second wire portions 213 are disposed above the extension portions 121 of the second longitudinal wires 120.

The second wire portions 213 extend from rear ends of the first support portions 212 and (as the second wire portions 213 are bent laterally inward from these end portions) are directed in the laterally inward directions, and arranged adjacent the first wire portion 211 in a position rearward of the first wire portion 211. To elaborate further, as shown in FIG. 5, the second wire portions 213 are located rearward of the center portion 211C that is a portion located rearward of the sciatic positions SP.

As shown in FIG. 3(a), the second transverse wire 220 includes a center portion 221, first intermediate portions 222, second intermediate portions 223, and end portions 224.

The center portion 221 extends in the lateral direction, and disposed above the front inclined portions 124 of the left and right second longitudinal wires 120 so as to cross over the front inclined portions 124.

The first intermediate portions 222 are bent and extend from left and right ends of the center portion 221 rearward, i.e., toward a direction to which one end (rear end) of each front inclined portion 124 is pointed.

The second intermediate portions 223 are bent and extend from rear ends of the first intermediate portions 222 laterally outward. The second intermediate portions 223 are so arranged over the front extension portions 111 of the first longitudinal wires 110 that laterally outer end portions thereof cross over the front extension portions 111.

The end portions 224 are bent and extend from laterally outer ends of the second intermediate portions 223 rearward, i.e., toward a direction to which one end (rear end) of each front extension portion 111 is pointed.

As shown in FIG. 3(b), the first intermediate portions 222 of the second transverse wire 220 are nonparallel to the front inclined portions 124 of the second longitudinal wires 120 as viewed from above. By extension, as shown in FIG. 3(c), the first intermediate portion 222 crosses the front inclined portion 124 as viewed from the left or right side. Herein, the front inclined portion 124 of the second longitudinal wire 120 may be referred to as "first portion", the center portion 221 of the second transverse wire 220 may be referred to as "second portion", and the first intermediate portion 222 of the second transverse wire 220 may be referred to as "third portion".

Turning to FIG. 3(d), the end portion 224 of the second transverse wire 220 crosses the front extension portion 111 of the first longitudinal wire 110, as viewed from the left or right side, and thus is nonparallel to the front extension portion 111. Herein, the front extension portion 111 of the first longitudinal wire 110 may be referred to as "first portion", the second intermediate portion 223 of the second transverse wire 220 may be referred to as "second portion", and the end portion 224 of the second transverse wire 220 may be referred to as "third portion".

As shown in FIG. 3(a), the plastic member 300 is configured to cover the bridging wires 100 and the reinforcing wires 200, and connects the bridging wires 100 and the reinforcing wires 200 together. To be more specific, the bridging wires 100 and the reinforcing wires 200 are so arranged as to be kept out of contact with each other at crossovers, and spaced predetermined distances apart from each other, and the thus-spaced apart bridging and reinforcing wires 100, 200 in entirety are covered with and connected together by the plastic member 300. For this purpose, the plastic member 300 (to be more specific, plastic material of the plastic member 300) exist in gaps each formed between a portion of the bridging wires 100 which crosses the reinforcing wires 200 and a corresponding portion of the reinforcing wires 200 which crosses that portion of the bridging wires 100.

Figure 4:
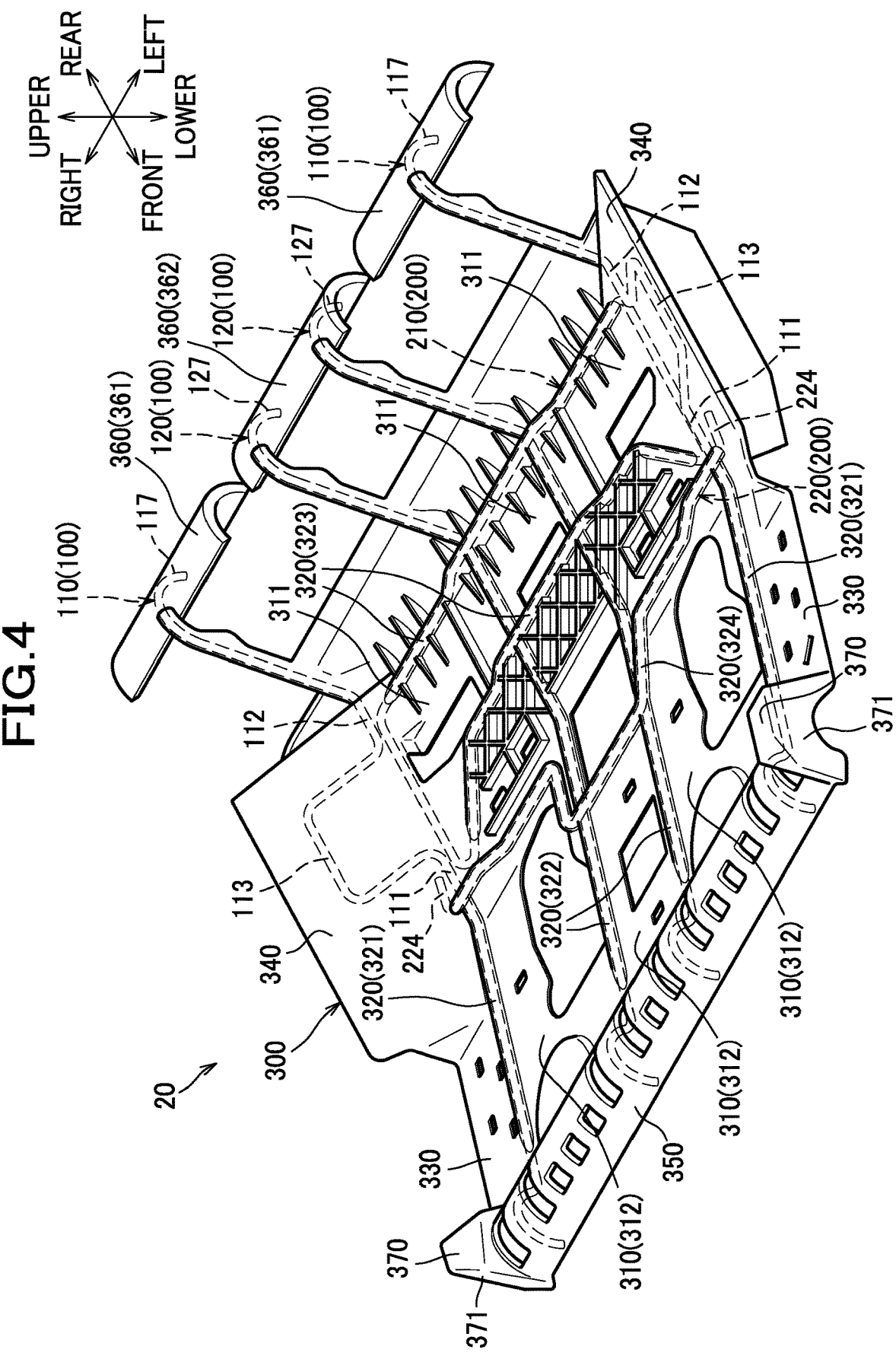
FIG. 4 is a diagram showing the support member.

As shown in FIG. 4, the plastic member 300 is configured to include a base portion 310, wire covering portions 320, mount portions 330, second support portions 340, a front hook portion 350 as a hook portion, rear hook portions 360, and a pair of left and right frame contact portions 370.

The wire covering portions 320 are portions with which the bridging wires 100 and the reinforcing wires 200 enveloped therein are covered; in the present embodiment, the wire covering portions 320 have bead-shaped configuration which protrudes upward with respect to the base portion 310 and the mount portions 330. The wire covering portions 320 include first longitudinal wire covering portions 321 with which the first longitudinal wires 110 are covered, second longitudinal wire covering portions 322 with which the second longitudinal wires 120 are covered, first transverse wire covering portions 323 with which the first transverse wire 210 is covered, and a second transverse wire covering portion 324 with which the second transverse wire 220 is covered. In the present embodiment, the first longitudinal wire covering portions 321 and the second longitudinal wire covering portions 322 may be referred to as "bridging wire covering portion", and the first transverse wire covering portions 323 and the second transverse wire covering portion 324 may be referred to as "reinforcing wire covering portion". The wire covering portions 320 are configured such that the bridging wires 100 and the reinforcing wires 200 are connected with plastic interposed therebetween particularly in each of portions thereof at which the bridging wire 100 and the reinforcing wire 200 are crossed by each other.

The base portion 310 is a portion interposed between the left and right first longitudinal wire covering portions 321, and so provided as to connect adjacent first and second longitudinal wire covering portions 321, 322 or adjacent second longitudinal wire covering portions 322. The base portion 310 includes a horizontal portion 311 and an inclined portion 312 formed in a front-side portion of the support member 20.

Figure 8:
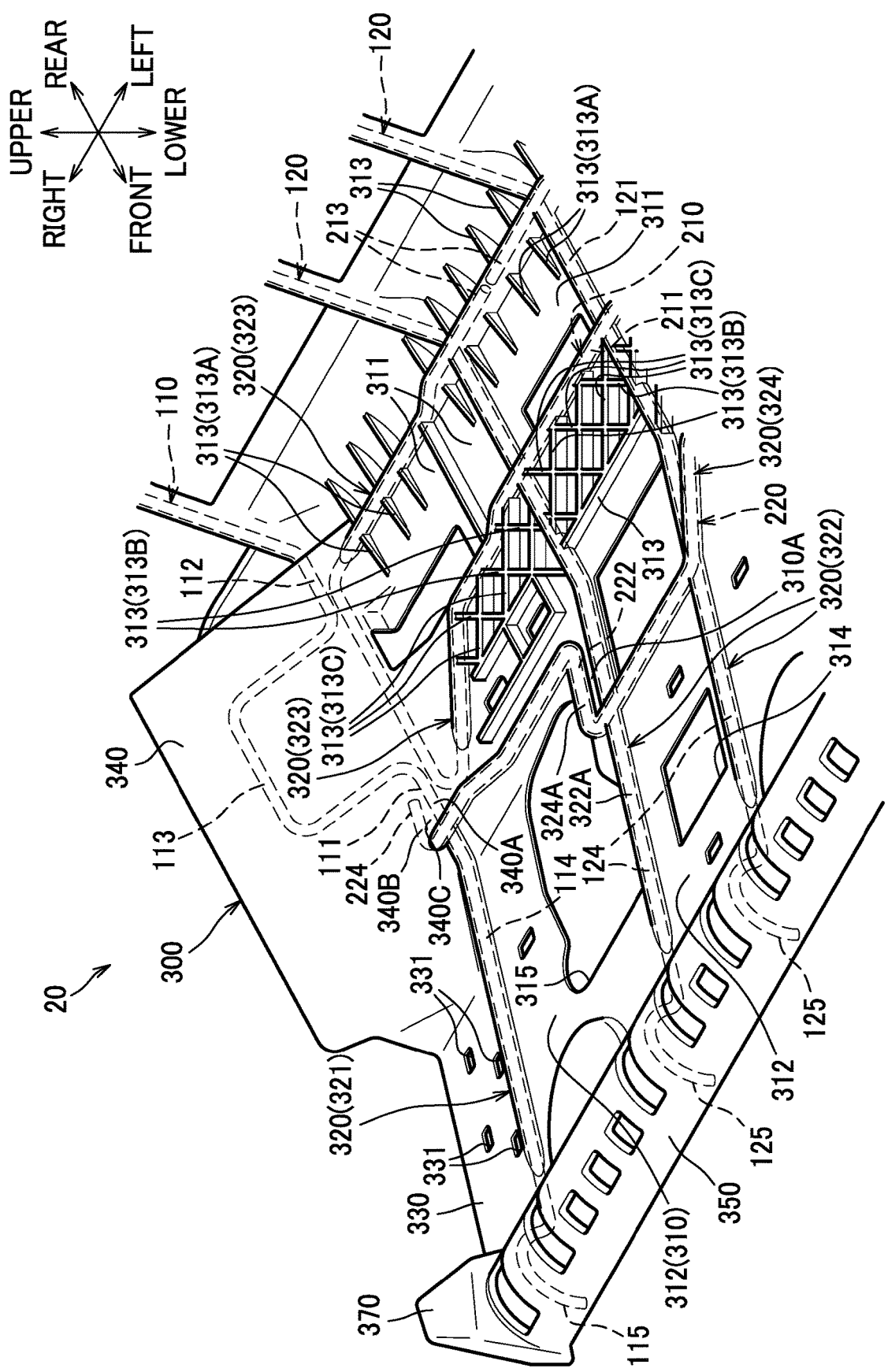
FIG. 8 is a partially enlarged view of the support member.

As shown in an enlarged view of FIG. 8, the horizontal portion 311 extends along the extension portions 121 of the second longitudinal wires 120, that is, substantially in the front-rear direction. On the upper surface of the horizontal portion 311, a plurality of ribs 313 are formed which protrude upward, and of which the direction of protrusion is thus the same as that of the wire covering portions 320. Each rib 313 joins to the wire covering portion(s) 320 so as to be integral with the wire covering portion(s) 320. In other words, each rib 313 is so arranged as to extend from the wire covering portion(s) 320. With this configuration, the plastic member 300 can be enhanced in rigidity, and the support member 20 can be enhanced in rigidity accordingly.

In the present embodiment, the ribs 313 include first ribs 313A, second ribs 313B, and third ribs 313C.

The first ribs 313A are disposed between the front and rear first transverse wire covering portions 323 and extend substantially in the front-rear direction. Each first rib 313A has one end (rear end) joining to the wire covering portion 320, particularly to the rear first transverse wire covering portion 323 that is one of the wire covering portions 320 located rearward (portion with which the second wire portions 213 are covered). The first rib 313A has the other end (front end), and an upper surface so shaped as to incline in an obliquely-frontward-and-downward direction, so that the amount of protrusion of the first rib 313A from the upper surface of the horizontal portion 311 (in other words, the height of the first rib 313A) gradually decreases toward the front end. With this configuration, a touch of something stepped which would be produced by provision of the first ribs 313A can be reduced so that the feel of seating for a person seated on the seat can be made more comfortable.

The second ribs 313B and the third ribs 313C are disposed between the first transverse wire covering portion 323 and the second transverse wire covering portion 324, and extend obliquely with respect to the lateral direction. Each second rib 313B has one end (front end) joining to the second longitudinal wire covering portion 322 and the other end (rear end) joining to the front first transverse wire covering portion 323 that is one of the wire covering portions located frontward (portion with which the first wire portion 211 is covered). With this configuration, the plastic member 300 can be further enhanced in rigidity, and the support member 20 can thus be further enhanced in rigidity. Each third rib 313C extends parallel to or perpendicular to the second ribs 313B. In the present embodiment, a latticed pattern of ribs are formed by the second ribs 313B and the third ribs 313C between the first transverse wire covering portion 323 and the second transverse wire covering portion 324. With this configuration, the plastic member 300 can be still further enhanced in rigidity, and the support member 20 can thus be still further enhanced in rigidity.

Figure 7:
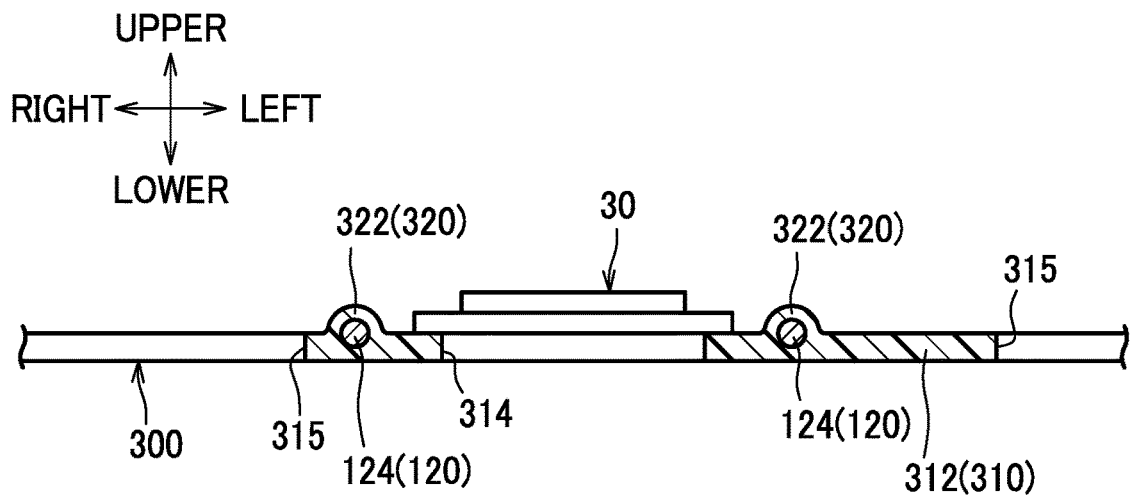
FIG. 7 is a sectional view taken along the line W-W of FIG. 5.
Figure 14:
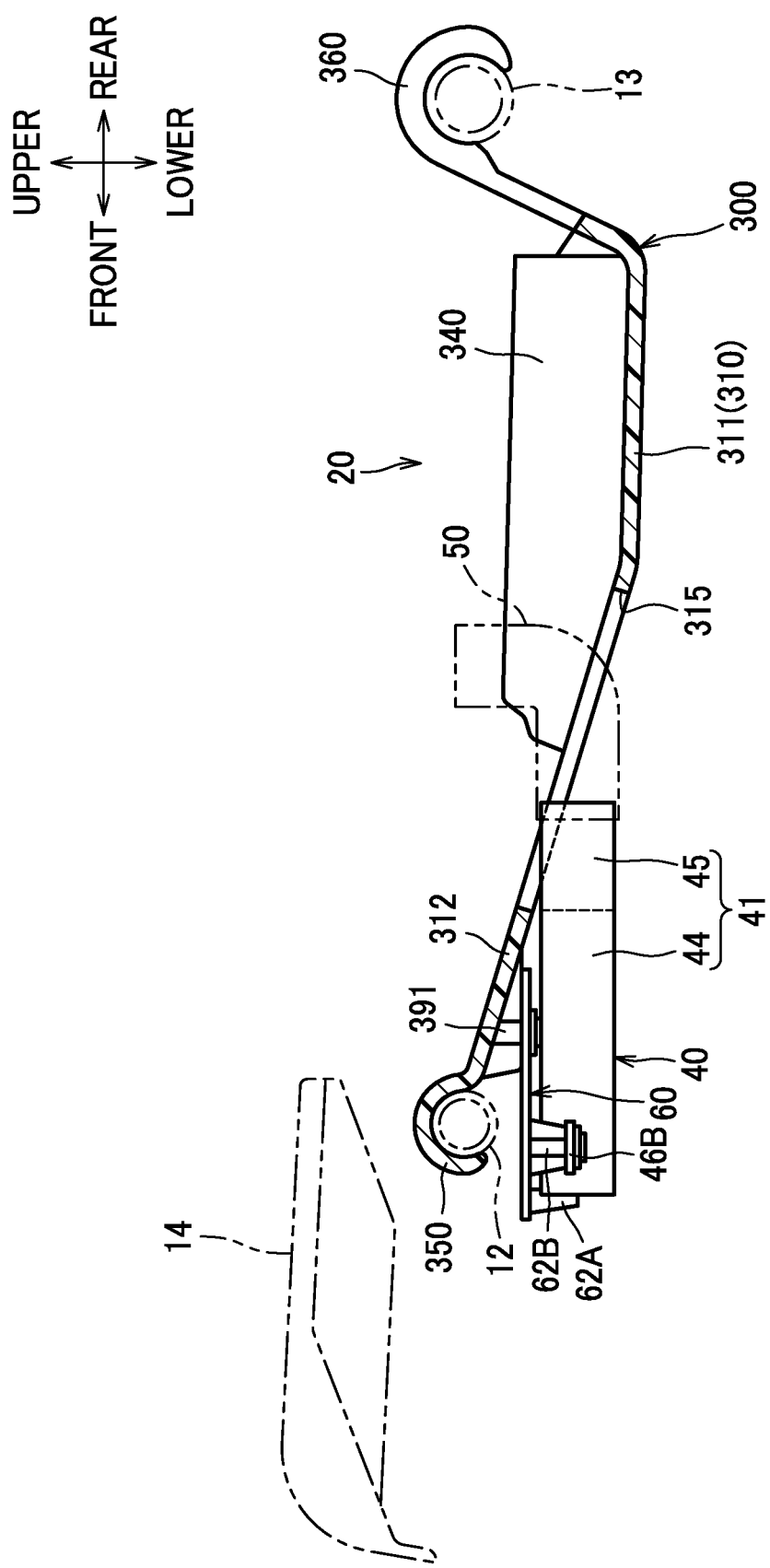
FIG. 14 is a side view of the blower, the bracket and the support member.

The inclined portion 312 extends along the front inclined portions 114, 124 of the longitudinal wires 110, 120 from the front end of the horizontal portion 311 in an obliquely-frontward-and-upward direction (see also FIG. 14). As shown in FIG. 7, a seating sensor 30 is disposed on the upper surface of the inclined portion 312. The seating sensor 30 is a known sensor for detecting the seating of an occupant on the car seat S. In the present embodiment, the seating sensor 30 is disposed between adjacent bridging wires 100, specifically, between the second longitudinal wires 120. To elaborate, the seating sensor 30 is disposed in a position at a center or its vicinity of the upper surface of the inclined portion 312 between the second longitudinal wire covering portions 322. With this configuration, the seating sensor 30 is disposed between the rigidity-enhanced portions, of the plastic member 300, reinforced by the adjacent second longitudinal wires 120; therefore, the rigidity in the mounting structure for the seating sensor 30 can be enhanced. At a center or its vicinity of the inclined portion 312, a substantially rectangular first through hole 314 extending through upper and lower sides thereof is formed. As shown in FIG. 9, a harness 31 extending from the seating sensor 30 is routed through the first through hole 314, drawn out under the support member 20, then directed frontward, and connected to a connector 32 attached to the pan frame 14.

As shown in FIG. 8, in the plastic member 300, each second longitudinal wire covering portion 322 includes a first covering portion 322A with which the front inclined portion 124 is covered, and the second transverse wire covering portion 324 includes a second covering portion 324A with which the first intermediate portions 222 are covered, and the base portion 310 includes a connecting portion 310A by which each first covering portion 322A and the second covering portion 324A are connected. As described above, the first intermediate portion 222 is non-parallel to the front inclined portion 124; therefore, in comparison with an alternative configuration in which the first intermediate portion 222 is parallel to the front inclined portion 124, the first covering portion 322A and the second covering portion 324A connected by the connecting portion 310 are rendered unlikely to rotate relative to each other, because they are in contorted positions relative to each other. In other words, the plastic member 300 is rendered unlikely to deform particularly at and around the connecting portions 310A. With this configuration, the plastic member 300 can be enhanced in rigidity, and the support member 20 can thus be enhanced in rigidity.

The mount portions 330 are plate-shaped portions constituting front-side portions of the left and right side portions of the plastic member 300, and so provided as to extend from the front end portions of the left and right first longitudinal wire covering portions 321 laterally outward. The mount portions 330 extend in the front-rear direction along the front inclined portions 114, 124 of the longitudinal wires 110, 120. The mount portions 330, in other words, portions of the plastic member 300 on which no wire covering portion 320 is provided, have a plurality of mounting holes 331 so formed as to extend through upper and lower sides thereof. The mounting holes 331 are holes for use in mounting other members to the support member 20. Examples of other members to be mounted to the support member 20 may include, as shown in FIG. 9, harnesses 81-83 to be connected to electric components such as a motor and a sheet heater (not shown) installed in the car seat S. To be more specific, the harnesses 81-83 are held in a harness clip 84 known in the art and are mounted to the support member 20 by claws (not shown) of the harness clip 84 getting engaged in the mounting hole 331. In this way, as the mounting holes 331 are formed in positions clear of the wire covering portions 320, the mounting holes 331 for use in mounting the other members to the plastic member 300 can be provided with ease. Moreover, this is more advantageous as a structure for mounting other members, for example, in comparison with an alternative configuration in which a claw-shaped portion or the like adapted to engage with the other member is formed in the plastic member 300, in that the support member 20 herein can be prevented from having an undesirably complicate structure. The harnesses 81-83 are connected to the connectors 85 attached to the pan frame 14. The holes for use in mounting the other members may be provided any places as long as they are in positions clear of the wire covering portions 320, for example, in the base portion 310 and/or other portions.

As shown in FIG. 4, the second support portions 340 are substantially plate-shaped portions constituting rear-side portions of the left and right side portions of the plastic member 300, and so provided as to extend from the base portion 310 (specifically, the horizontal portion 311 and the rear end portion of the inclined portion 312) in obliquely-laterally-outward-and-upward directions. The second support portions 340 are configured to envelop and cover the rear end portions of the front extension portions 111 of the first longitudinal wires 110, the rear extension portions 112 and the bent portions 113, the left and right end portions of the first transverse wire 210, and the end portions 224 of the second transverse wire 220. As shown in FIG. 9, ribs 341, 342 protruding downward are formed on undersurfaces of the second support portions 340. A plurality of ribs 341 extending substantially in the front-rear direction are arranged in the lateral direction. A plurality of ribs 342 extending substantially in the lateral direction are arranged in the front-rear direction. As shown in FIG. 6, each laterally extending rib 342 has a substantially triangular shape as viewed from the front or rear direction, and extends from a position laterally outward of the laterally outer end of the bent portion 113 to a position laterally inward of the laterally inner end of the bent portion 113.

As shown in FIG. 8, in the present embodiment, each second support portion 340 includes a first covering portion 340A with which the rear end portion of the front extension portion 111 of the first longitudinal wire 110 is covered, a second covering portion 340B with which the end portion 224 of the second transverse wire 220 is covered, and a connecting portion 340C by which the first covering portion 340A and the second covering portion 340B are connected. As described above, the end portion 224 is nonparallel to the front extension portion 111; therefore, in comparison with an alternative configuration in which the end portion 224 is parallel to the front extension portion 111, the first covering portion 340A and the second covering portion 340B are rendered unlikely to rotate relative to each other, and the second support portion 340 is rendered unlikely to deform particularly at and around the connecting portion 340C. With this configuration, the plastic member 300 can be enhanced in rigidity, and the support member 20 can thus be enhanced in rigidity.

The front hook portion 350 is a portion to be hooked on the front frame 12, and has a laterally elongate substantially semicylindrical shape. The front hook portion 350 is a portion of the plastic member 300 (i.e., plastic of which the plastic member 300 is made) with which the front hooked portions 115, 125 of the longitudinal wires 110, 120 are covered.

As shown in FIG. 4, the rear hook portions 360 are portions to be hooked on the rear frame 13. The rear hook portions 360 include left and right first rear hook portions 361, and a second rear hook portion 362 disposed between the left and right first rear hook portions 361. The left and right first rear hook portions 361 are portions of plastic with which the rear hooked portions 117 of the corresponding first longitudinal wires 110 are covered, respectively. Similarly, the second rear hook portion 362 is a portion of plastic with which the rear hooked portions 127 of the two second longitudinal wires 120 are covered. As shown in FIGS. 9(a), (b), the harnesses 81, 82 are routed through a gap between the left first rear hook portion 361 and the second rear hook portion 362 on the rear frame 13. The gap between the first rear hook portion 361 and the second rear hook portion 362 forms a space recessed relative to the upper surfaces of the first rear hook portion 361 and the second rear hook portion 362; therefore, arrangement of the harnesses 81, 82 in this space can serve to reduce a touch of something stepped which would be produced by arrangement of the harnesses 81, 82.

As shown in FIG. 4, the frame contact portions 370 are portions contactable with position restriction surfaces 14A (see FIG. 10) of the pan frame 14, which will be described later, from the laterally inner sides thereof, and are provided at the left and right sides of the front hook portion 350. To be more specific, the frame contact portions 370 are configured to protrude at the left and right sides of the front hook portion 350 upward beyond the front hook portion 350. The frame contact portions 370 have, at the laterally outer sides of their front portions, contact surfaces 371 contactable with the position restriction surfaces 14A of the pan frame 14.

Figure 10:
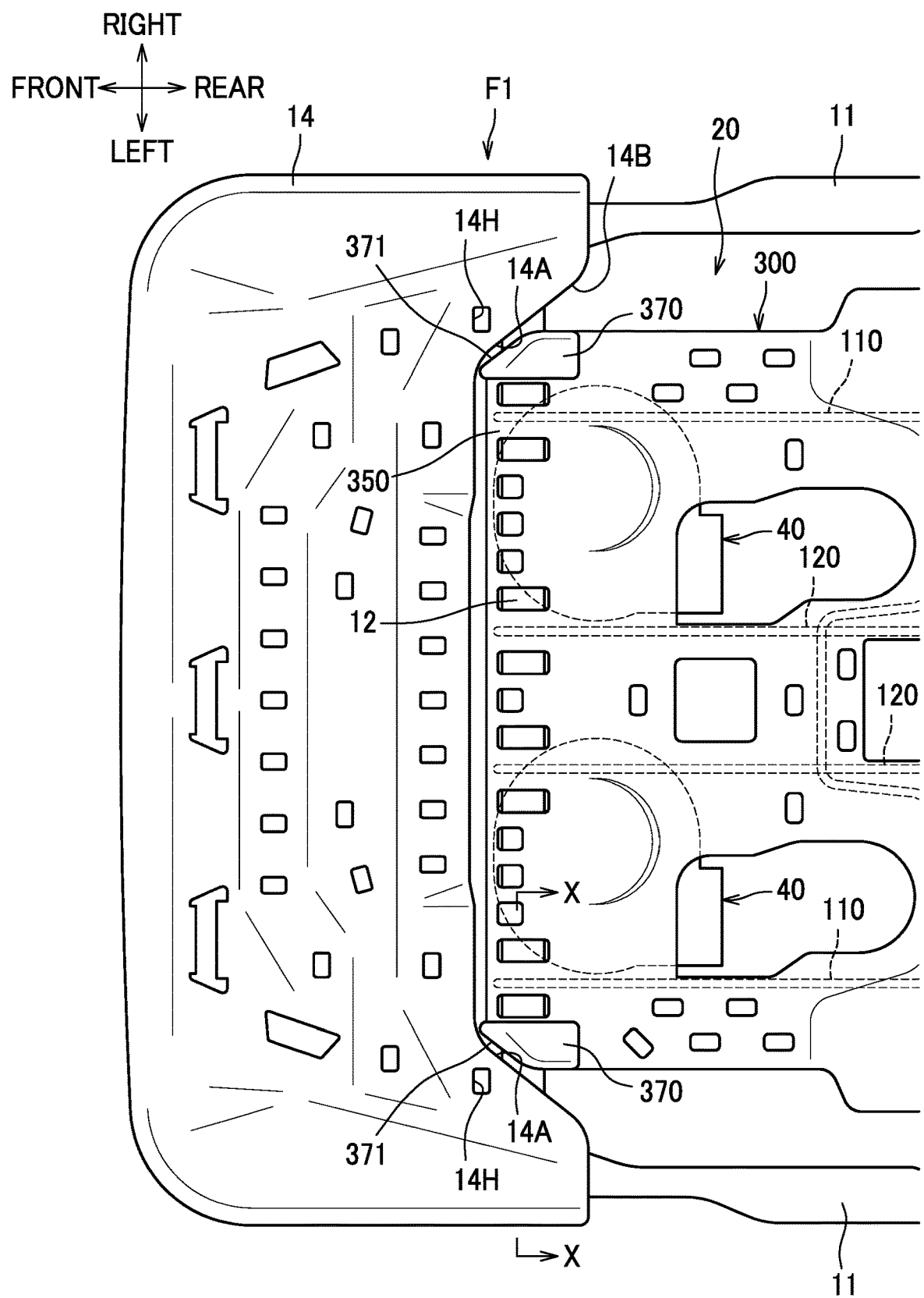
FIG. 10 is a top view of a front-side portion of the support member and a pan frame.
Figure 11:
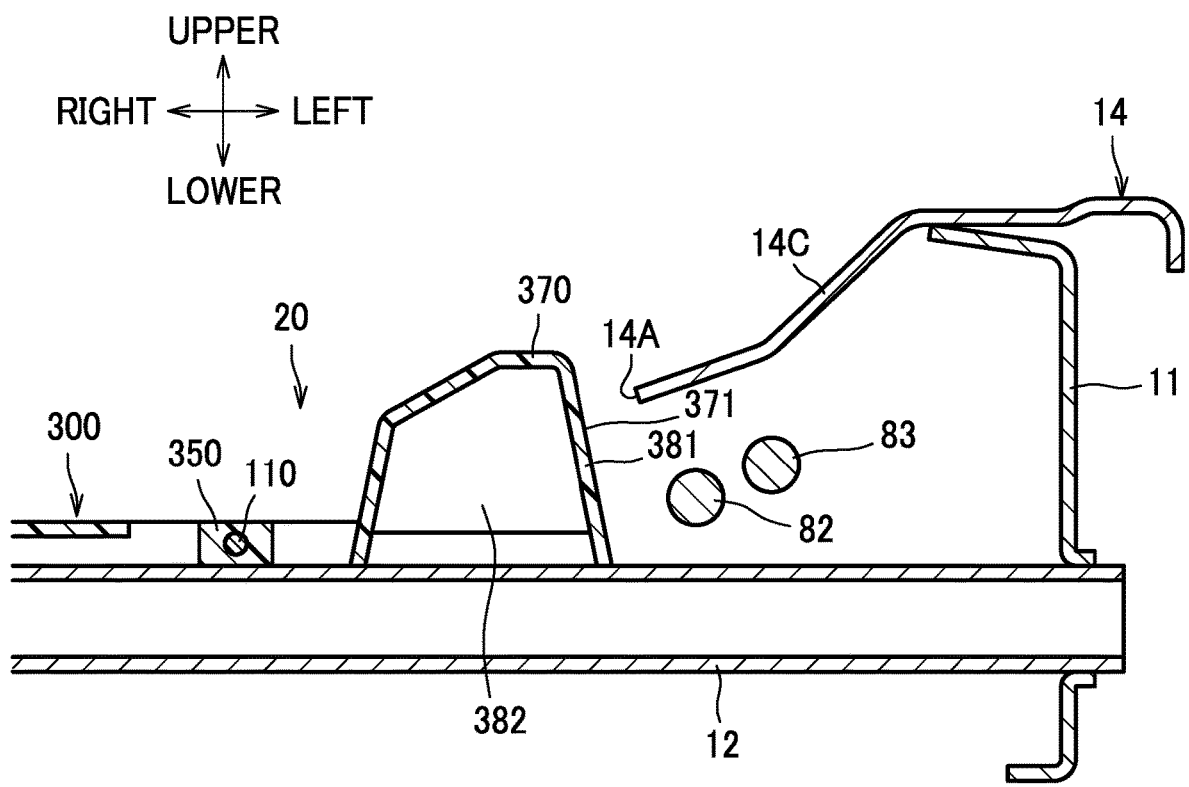
FIG. 11 is a sectional view taken along the line X-X of FIG. 10.

As shown in FIG. 10, the pan frame 14 has a pair of position restriction surfaces 14A facing laterally inward. To be more specific, the pan frame 14 includes a recess 14B at a laterally middle region of a rear end portion thereof; the recess 14B has a substantially U-shaped configuration which is recessed frontward, and left and right surfaces of the recess 14B provide the position restriction surfaces 14A. The plastic member 300 (support member 20) is so disposed as to have its front end portion received inside the recess 14B, and the frame contact portions 370 are disposed adjacent to the laterally inner sides of the left and right corresponding position restriction surfaces 14A. To elaborate further, the contact surfaces 371 of the frame contact portions 370 are so located adjacent to the laterally inner sides of the corresponding position restriction surfaces 14A as to face the position restriction surfaces 14A. The contact surfaces 371 and the position restriction surfaces 14A are each formed as an inclined surface which is inclined laterally outward toward a side (in the front-to-rear direction) on which the pan frame 14 and the support member 20 are arranged (i.e., toward rearward). As shown in FIG. 11, the frame contact portions 370 are so provided at the left and right ends of the front hook portions 350 as to protrude therefrom upward beyond the position restriction surfaces 14A formed at the rear-side edges of the pan frame 14.

As shown in FIG. 9 and FIG. 11, the pan frame 14 made of sheet metal includes, at laterally outer sides of the recess 14B, plate-shaped portions 14C disposed on the laterally outer sides of the frame contact portions 370. The harnesses 82, 83 are disposed under the left plate-shaped portion 14C. In the present embodiment, the harnesses 82, 83 may be referred to as "electric wire(s)". With this configuration, the harnesses 82, 83 are disposed under the cushion frame F1 having a greater rigidity; therefore, the harnesses 82, 83 that are elastic members disposed inside the car seat S can be rendered unlikely to receive a force. The harnesses 82, 83 are held in the harness clip 86, and attached to the pan frame 14 by engagement of the harness clip 86 in a mounting hole 14H formed in the plate-shaped portion 14C.

Figure 12:
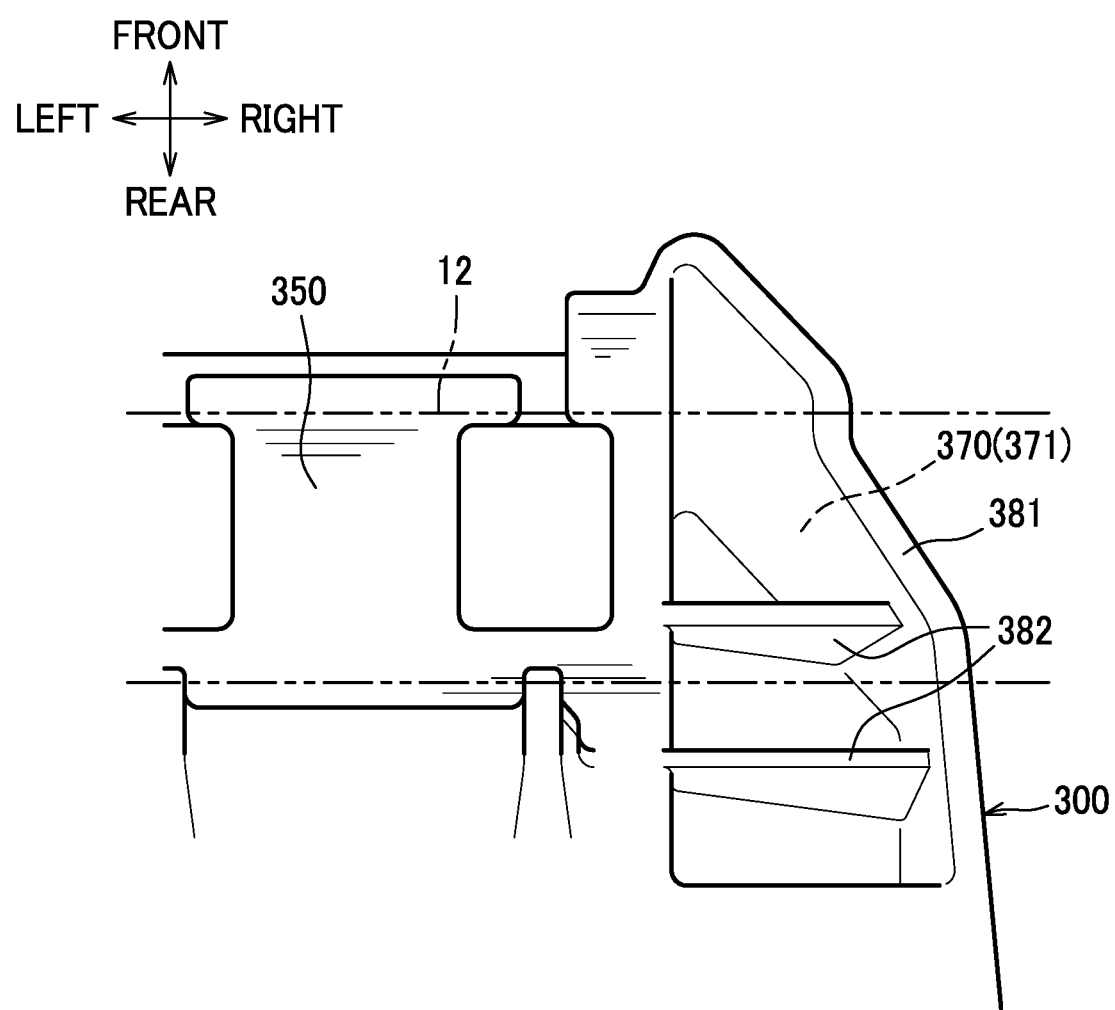
FIG. 12 is a bottom view of a frame contact portion and its vicinity of the support member.

As shown in the bottom view of FIG. 12, the plastic member 300 includes, at a front end portion thereof, an outer sidewall 381 and ribs 382.

The outer sidewall 381 constitutes a laterally outer wall of a front end portion (including a laterally outer wall of the frame contact portion 370) of the plastic member 300.

The ribs 382 are configured to protrude downward, arranged to extend laterally inward from the outer sidewall 381 which extends substantially in the front-rear direction, and shaped to be adjoined to the upper portion of the front hook portion 350. There are two ribs 382 arranged in the front-rear direction, of which one is disposed in a longitudinally front position near the rear end of the inclined contact surface 371 of the frame contact portion 370, and the other is disposed in a longitudinally rear position that is rearward of the longitudinally front position. The ribs 382 are configured to be located over the front frame 12 when the front hook portion 350 is hooked on the front frame 12.

Figure 13:
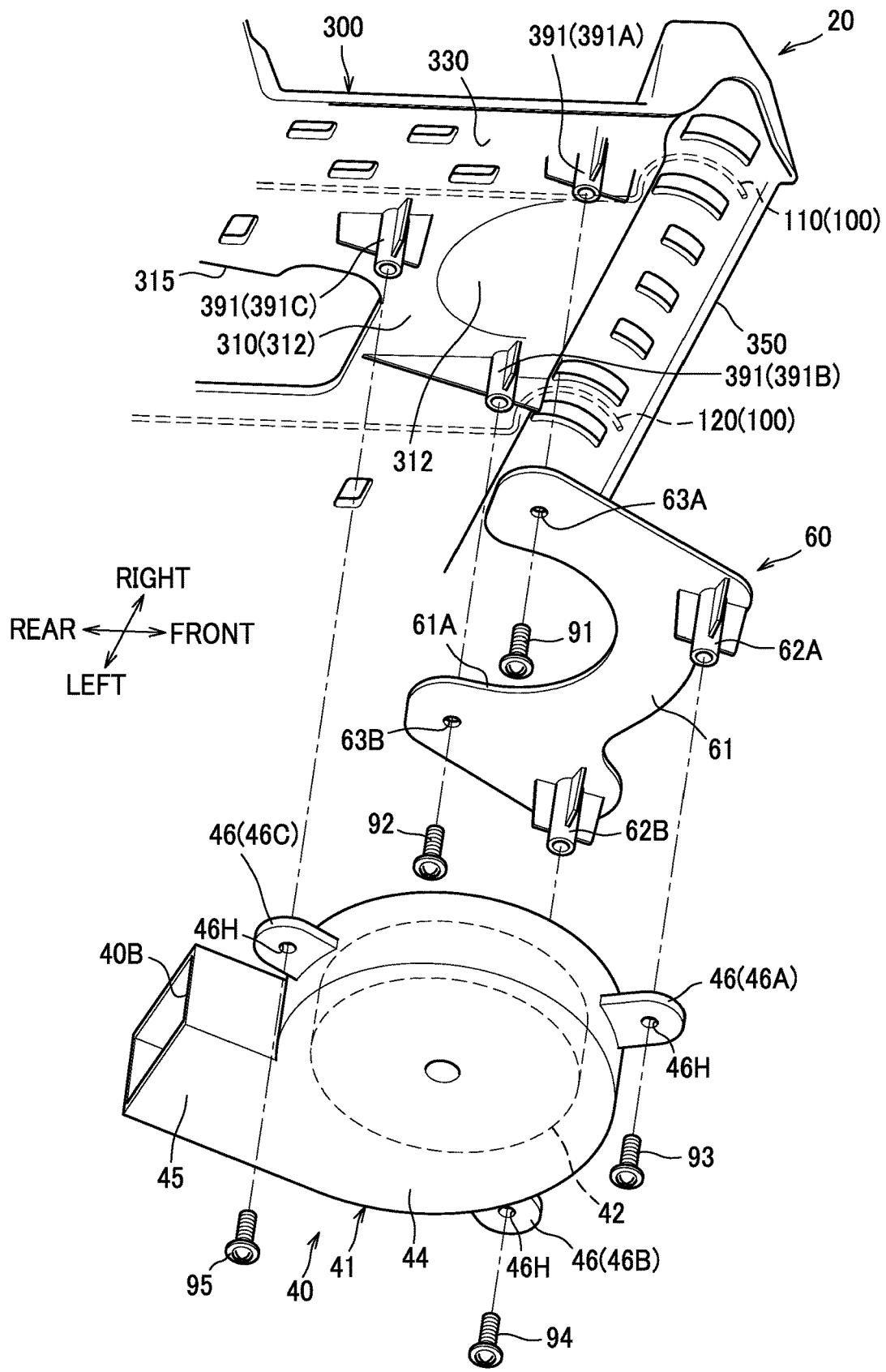
FIG. 13 is a diagram showing a blower, a bracket and the support member.

As shown in FIG. 13, a blower 40 is disposed below the support member 20. Although not illustrated in the drawing, the pad material of the seat cushion S1 has a plurality of air vents formed in the upper surface and air passages connected to the air vents; an outlet 40B of the blower 40 is connected via a duct 50 (see FIG. 14) to the air passage. With this arrangement, the car seat S is configured such that air is caused to blow out from the upper surface of the seat cushion S1 when the blower 40 is actuated.

The blower 40 is, for example, a sirocco fan, and includes a housing 41, an impeller 42, and a motor (not shown) for causing the impeller 42 to rotate.

The housing 41 includes a housing body 44 in which the impeller 42 and the motor are housed, a tubular outlet portion 45 extending rearward from the left end portion of the housing body 44, and plate-shaped fixing portions 46 extending outward from the housing body 44. At an upper surface of the housing body 44, an intake port (not shown) for admitting air is formed; at a rear end of the outlet portion 45, the outlet 40B for blowing out air is formed. The fixing portions 46 include a first fixing portion 46A, a second fixing portion 46B and a third fixing portion 46C. The first fixing portion 46A is so formed as to extend from the housing body 44 in an obliquely-rightward-and-frontward direction, and the second fixing portion 46B is so formed as to extend from the housing body 44 in an obliquely-leftward-and-frontward direction. The third fixing portion 46C is so formed as to extend from the housing body 44 substantially rearward. Each fixing portion 46 has a through hole 46H formed therein.

The blower 40 is attached to the support member 20. To be more specific, the blower 40 includes a front-side portion attached via a bracket 60 to the support member 20, and a rear-side portion attached directly to the support member 20.

The bracket 60 is mounted on an underside of the support member 20, and includes a plate-shaped bracket body 61, bosses 62A, 62B, and through holes 63A, 63B. The bracket body 61 has a substantially U-shaped configuration, and has an opening 61A formed therein in a position corresponding to the intake port of the blower 40, which opening 61A opens upward, downward and rearward. Each boss 62A, 62B is so formed as to have a cylindrical shape protruding downward from an undersurface of the bracket body 61. The boss 62A is provided at a right side of a front end portion of the bracket body 61, and the boss 62B is provided at a left side of the front end portion of the bracket body 61. The through holes 63A, 63B are holes extending through upper and lower sides of the bracket body 61. The through holes 63A, 63B are provided in such positions that the through hole 63A is disposed at a right side of a rear end portion of the bracket body 61 and the through hole 63B is disposed at a left side of the rear end portion of the bracket body 61 with the opening 61A disposed therebetween.

As shown in FIG. 9, the plastic member 300 that constitutes the support member 20 includes right and left blower mount portions 390R, 390L to which the blower 40 is to be attached. The car seat S consistent with the present embodiment may be configured to have the blower 40 attached to a position varying according to its specifications. To be more specific, the blower 40 may be attached to either of the right blower mount portion 390R and the left blower mount portion 390L according to the specification of the car seat S. For example, when the car seat S is to be installed as the right seat, the blower 40 may be attached to the right blower mount portion 390R; when the car seat S is to be installed as the left seat, the blower 40 may be attached to the left blower mount portion 390L. Since the configurations of the right and left blower mount portions 390R, 390L are substantially the same as each other, the following detailed description will be directed mainly to the right blower mount portion 390R.

The blower mount portion 390R includes, as shown in FIG. 13, a plurality of cylindrical bosses 391 protruding downward from the undersurface of the plastic member 300. The bosses 391 include a first boss 391A, a second boss 391B, and a third boss 391C. The first boss 391A, the second boss 391B and the third boss 391C are located in positions corresponding to the apexes of a triangle as viewed from below. To be more specific, the first boss 391A and the second boss 391B are located in positions laterally separated from each other; the third boss 391C is located in a position rearward of the positions of the first boss 391A and the second boss 391B and between the first boss 391A and the second boss 391B in the lateral direction. The first boss 391A is located on the front end portion of the right mount portion 330; the second boss 391B and the third boss 391C are located in positions on the front end portion of the inclined portion 312 between the right first longitudinal wire 110 and the right second longitudinal wire 120. To elaborate, the first boss 391A is located at the right side of the right first longitudinal wire 110, and the second boss 391B and the third boss 391C are located at the left side of the right first longitudinal wire 110. In other words, the bosses 391 are located at both sides of the right first longitudinal wire 110 in the lateral direction.

As shown in FIG. 9, in the left blower mount portion 390L, the first boss 391A is located in a position on the front end portion of the inclined portion 312 between the left and right second longitudinal wires 120; the second boss 391B and the third boss 391C are located in positions on the front end portion of the inclined portion 312 between the left second longitudinal wire 120 and the left first longitudinal wire 110. To elaborate, in the left blower mount portion 390L, the first boss 391A is located at the right side of the left second longitudinal wire 120; the second boss 391B and the third boss 391C are located at the left side of the left second longitudinal wire 120. In other words, in the left blower mount portion 390L as well, the bosses 391A-391C are located at both sides of the left second longitudinal wire 120 in the lateral direction.

Hereinafter, one example of the way how to attach the blower 40 to the support member 20 is described.

As shown in FIG. 13, when the blower 40 is attached to the support member 20, first, the bracket 60 is attached at the lower side of the support member 20. To be more specific, the screw 91 is inserted through the through hole 63A of the bracket 60 and screwed into the first boss 391A, and the screw 92 is inserted through the through hole 63B of the bracket 60 and screwed into the second boss 391B. Thereafter, the blower 40 is attached to the lower sides of the bracket 60 and the support member 20. To be more specific, the screw 93 is inserted through the through hole 46H of the first fixing portion 46A formed in the blower 40, and screwed into the boss 62A of the bracket 60, and the screw 94 is inserted through the through hole 46H of the second fixing portion 46B and screwed into the boss 62B of the bracket 60, so that the front-side portion of the blower 40 is attached to the bracket 60. Similarly, the screw 95 is inserted through the through hole 46H of the third fixing portion 46C formed in the blower 40 and screwed into the third boss 391C of the plastic member 300, so that the rear-side portion of the blower 40 is directly attached to the support member 20.

In the present embodiment, the blower 40 is attached, partly through the bracket 60, to the support member 20; therefore, in comparison with an alternative embodiment in which the blower 40 in its entirety is attached directly to the support member 20, the degree of flexibility in attachment of the blower 40 can be increased. Moreover, as the degree of flexibility in arrangement of the blower 40 inside the car seat S can be increased, the space inside the car seat S can be utilized effectively.

Particularly, in the present embodiment, part of the blower 40, i.e., the front-side portion thereof, is attached to the bracket 60, and the blower 40 is thereby attached to the support member 20 through the bracket 60, and the rear-side portion thereof is directly attached to the support member 20; therefore, the blower 40 can be attached in a position under the front hook portion 350, which would be considered to be a position in which a boss for attachment is not easy to provide. Accordingly, the degree of flexibility in attachment of the blower 40 can be further increased. Also, the degree of flexibility in arrangement of the blower 40 inside the car seat S can be further increased, so that the space inside the car seat S can be utilized more effectively.

Since the blower 40 is attached to the plastic member 300, vibrations of the support member 20 associated with the operation of the blower 40, and/or noises produced by the vibrations of the operating blower 40, can be made lower, in comparison with an alternative configuration in which the blower 40 is attached to the bridging wires 100 or other members made of metal.

Moreover, since the blower 40 is attached to the protruding bosses 391 provided on the plastic member 300, the degree of flexibility in attachment of the blower 40 can be further increased in comparison, for example, with an alternative configuration in which the blower 40 is attached to a flat surface of the plastic member 300.

Since the bosses 391 are located at the both sides of the bridging wires 100, the blower 40 is attached to the plastic member 300 across the high-rigidity portion of the plastic member 300 reinforced by the bridging wires 100. With this configuration, the rigidity in the attachment structure of the blower 40 can be increased.

As shown in FIG. 14, the blower 40 attached to the support member 20 is disposed under the inclined portion 312 of the plastic member 300 that constitutes the support member 20. With this configuration, the space-saving arrangement of the blower 40 under the support member 20 can be realized, and the car seat S in which the blower 40 is included can thus be designed to be compact in size. Herein, the blower 40 is disposed to have the front-side portion thereof located under the front frame 12 made of metal.

As shown in FIG. 9, the inclined portion 312 of the plastic member 300 has second through holes 315 extending through upper and lower sides thereof in positions rearward of the second boss 391B. The second through holes 315 are provided one at each of the left and right sides of the inclined portion 312 corresponding to the left and right blower mount portions 390R, 390L. As shown in FIG. 14, each second through hole 315 is a through hole in which a duct 50 connected to the outlet portion 45 of the blower 40 is to be disposed. With this configuration, in comparison with an alternative configuration in which the duct is disposed around the support member 20, the cushion frame F1 (seat cushion S1) can be designed to be compact in size, and the car seat S can thus be designed to be compact in size.

As shown in FIG. 5, a portion of the plastic member 300 (inclined portion 312) between the front hook portion 350 and the second through hole 315 forms an insulating wall 316 that is a wall with which the housing body 44 of the blower 40, and by extension, the impeller 42 housed in the housing body 44, is covered, as viewed from above. With this configuration, sound insulation against noises produced by rotation of the impeller 42 can be achieved by the insulating wall 316 of the plastic member 300; therefore, the transmission of operating noises of the blower 40 to an occupant can be reduced. It is to be understood that the insulating wall 316 may be provided to cover the blower 40 in its entirety (including the outlet portion 45) as viewed from above.

According to the present embodiment as described above, the support member 20 which is configured to receive a load from an occupant can be made up of the bridging wires 100, the reinforcing wires 200 and the plate-shaped plastic member 300 with which the bridging wires 100 and the reinforcing wires 200 are covered, as shown in FIG. 2. As a result, the load from an occupant can be received by a surface having an effective bearing area. In addition, the support member 20 can be designed to have an adequate flexibility so as to be more appropriate in comparison with an alternative configuration in which the support member is made of metal plate. Furthermore, the plate-shaped plastic member 300 can be reinforced by the bridging wires 100 and the reinforcing wires 200 both of which are made of metal, and thus the support member 20 can be designed to have an adequate rigidity. With these features, the feel of seating for a person seated on the car seat S can be made more comfortable. Since the plastic member 300 is configured to cover and retain the bridging wires 100 and the reinforcing wires 200 spaced out of contact with each other, noises which would otherwise be produced by contact of the wires can be prevented.

Figure 3:
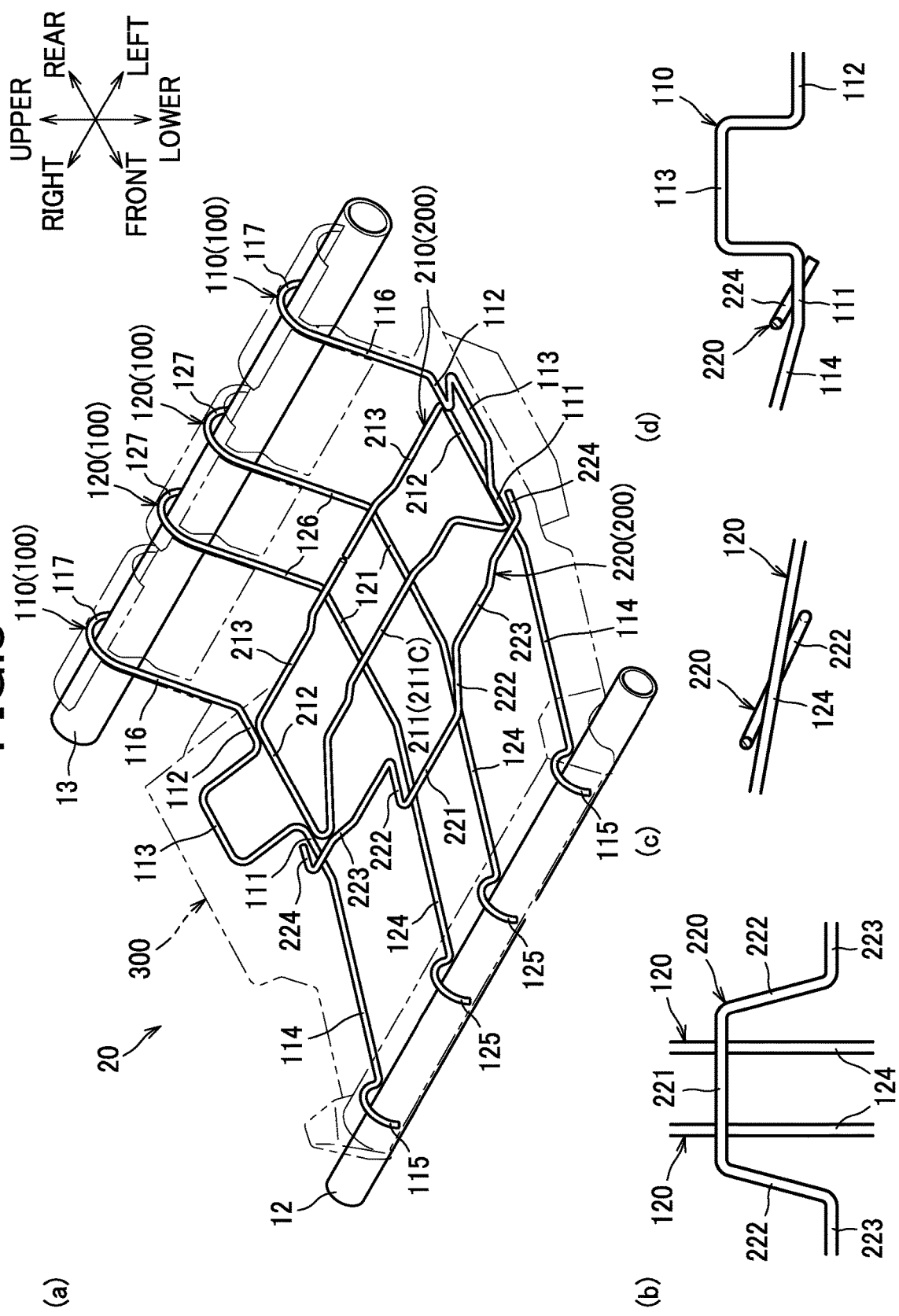
FIG. 3 includes: (a) a diagram showing bridging wires and reinforcing wires; (b) a top view and (c) a side view showing crossover(s) of a second longitudinal wire(s) and a second transverse wire; and (d) a side view showing crossover of a first longitudinal wire and the second transverse wire.

According to the present embodiment, as shown in FIGS. 3 and 4, each of the left and right first longitudinal wires 110 includes a substantially-U-shaped bent portion 113 protruding in an obliquely-laterally-outward-and-upward direction relative to the front or rear extension portion 111, 112; therefore, the left and right bent portions 113 can be so arranged as to sandwich and support an occupant from the left and right sides through the second support portions 340 of the plastic member 300. With this configuration, the car seat S can be provided with an improved holding feature. On the other hand, the bent portions 113 are provided by bending portions of the left and right first longitudinal wires 110; thus, in comparison with an alternative configuration in which a separate member having a feature so arranged as to sandwich and support an occupant from the left and right sides is provided, the number of parts of the car seat S can be reduced.

In the present embodiment, since the first support portions 212 of the first transverse wire 210 are configured to support the bent portions 113 through the extension portions 111, 112 from below, the bent portions 113 can be supported by the first support portions 212 even when the first longitudinal wires 110 having the bent portions 113 are deformed downward upon seating of an occupant. As a result, excessive downward motion of the bent portions 113, in other words, excessive lowering of the bent portions 113 can be suppressed. This serves to make it possible to retain the holding feature provided by the left and right bent portions 113 upon seating of an occupant.

In the present embodiment, since the first support portions 212 can support the both of the front and rear sides of the bent portions 113, specifically, the both of the front extension portions 111 and the rear extension portions 112, excessive lowering of the bent portions 113 upon deformation of the first longitudinal wires 110 can be suppressed effectively. Accordingly, the holding feature provided by the left and right bent portions 113 upon seating of an occupant can be retained more satisfactorily.

In the present embodiment, since portions of the first transverse wire 210 which cross the second longitudinal wires 120 are disposed over the second longitudinal wires 120, the first transverse wire 210 including the first support portions 212 can be supported by the second longitudinal wires 120. With this arrangement, when the first longitudinal wires 110 deform downward, excessive lowering of the first transverse wire 210 itself can be suppressed effectively by the first support portions 212. As a result, the holding feature provided by the left and right bent portions 113 upon seating of an occupant can be retained still more satisfactorily.

In the present embodiment, since the plastic member 300 includes the plate-shaped second support portions 340 that cover the bent portions 113, an occupant can be supported by a surface having an effective bearing area, so that the feel of seating for the occupant can be made more comfortable.

In the present embodiment, as shown in FIG. 6, the ribs 342 provided on the undersides of the second support portions 340 extend laterally inward beyond the bent portions 113; therefore, the downward turn of the bent portions 113 on the laterally inner ends thereof can be suppressed by the support of the ribs 342. With this feature, the left and right bent portions 113 can be constrained from so deforming as to get wide open laterally outside due to a load from an occupant; therefore, the holding feature provided by the left and right bent portions 113 upon seating of the occupant can be retained satisfactorily.

In the present embodiment, as shown in FIG. 5, the first wire portion 211 so located as to cross the longitudinal wires 110, 120 is provided; therefore, the support member 20 which may receive a load from an occupant can be reinforced. Also, the first wire portion 211 is configured to have the center portion 211C located on the rear side with respect to the sciatic positions SP, so as to detour around the sciatic positions SP; therefore, deterioration in the feel of seating for the occupant due to a touch of the first wire portion 211 on the ischial regions and their vicinities of an occupant can be reduced.

In the present embodiment, the second wire portions 213 are further provided in addition to the first wire portion 211; therefore, the support member 20 can be reinforced more strongly. Moreover, since the second wire portions 213 are located in positions rearward of the center portion 211C of the first wire portion 211, so that deterioration in the feel of seating for the occupant due to a touch of the second wire portions 213 on the ischial regions and their vicinities of an occupant can be reduced.

In the present embodiment, as shown in FIG. 14, part of the blower 40 (the front-side portion of the blower 40) attached to the support member 20 is located under the front frame 12; therefore, a load from an occupant seated on the car seat S can be received and supported by the front frame 12 that is made of metal and thus has a greater rigidity. Accordingly, the load from the occupant can be made unlikely to be imposed on the blower 40.

In the present embodiment, as shown in FIG. 10, the pan frame 14 has a pair of left and right position restriction surfaces 14A, and the support member 20 includes a pair of left and right frame contact portions 370; thus, when the support member 20 in the state shown in FIG. 10 tends to move in the left or right direction to a large extent, the frame contact portion 370 of the support member 20 comes in contact with the position restriction surface 14A of the pan frame 14 from its laterally inner side. Accordingly, the support member 20 is restrained from further move in the left or right direction; thus, the lateral dislocation of the support member 20 can be restricted.

In the present embodiment, the support member 20 tends to move laterally along the front frame 12 on which the front hook portions 350 are hooked; therefore, provision of the frame contact portions 370 on both of the left and right sides of the front hook portion 350 can adequately cause the frame contact portions 370 to come in contact with the position restriction surfaces 14A from the laterally inner sides thereof. Accordingly, the lateral dislocation of the support member 20 can be restricted more effectively.

In the present embodiment, the frame contact portions 370 are so provided as to protrude upward beyond the position restriction surfaces 14A; therefore, even if the frame contact portions 370 involve some dimension errors, or when the pan frame 14 provided is configured to be movable upward and downward by a tilt mechanism, the position restriction surfaces 14A can be caused to come in good contact with the frame contact portions 370. Accordingly, the lateral dislocation of the support member 20 can be restricted still more effectively.

In the present embodiment, the support member 20 includes ribs 382 extending laterally inward from each outer sidewall 381 which includes the frame contact portion 370; therefore, the rigidity of the outer sidewall 381 can be enhanced. With this feature, the rigidity of the frame contact portion 370 can also be enhanced, and the lateral dislocation of the support member 20 can be restricted satisfactorily by the contact of the frame contact portion 370 and the position restriction surface 14A.

In the present embodiment, the frame contact portion 370 is so provided as to protrude upward beyond the front hook portion 350; therefore, the contact surfaces 371 can be given a sufficiently large size. Accordingly, the position restriction surfaces 14A can be caused to come in good contact with the frame contact portions 370, and the lateral dislocation of the support member 20 can be restricted more satisfactorily.

In the present embodiment, the position restriction surfaces 14A and the contact surfaces 371 are configured as slanted surfaces extending in obliquely-rearward-and-laterally-outward directions; therefore, in comparison with an alternative configuration in which the position restriction surfaces 14A and the contact surfaces 371 are configured as surfaces perpendicular to the lateral direction, an impact which the position restriction surface 14A and the contact surface 371 will have upon contact with each other can be reduced. Accordingly, the impact associated with restriction of dislocation of the support member 20 can be reduced.

Since the frame contact portions 370 are formed in the plastic member 300 made of plastic, noises which would be produced upon contact of the frame contact portion 370 with the position restriction surface 14A provided on the pan frame 14 made of metal can be suppressed. Accordingly, the noises associated with restriction of dislocation of the support member 20 can be reduced.

Although one embodiment of the present invention has been described above, the present invention is not limited to the above-described embodiment. Specific configurations may be modified where appropriate without departing from the gist of the present invention as will be described below. In the following description, the same components as of the above-described embodiment are designated by the same reference numerals, a duplicate description thereof will thus be omitted where appropriate, and a description of aspects different from those of the above-described embodiment will be given in detail.

For example, as shown in FIGS. 15(a), (b), a support member 20 configured according to a modified example includes left and right first longitudinal wires 110 and one third longitudinal wire 130 as a bridging wire; a first transverse wire 210 as a reinforcing wire; and a plastic member 300 with which the wires 110, 130, 210 are covered and integrated in one piece.

The third longitudinal wire 130 is disposed between the left and right first longitudinal wires 110, and arranged to bridge the front frame 12 and the rear frame 13. The third longitudinal wire 130 mainly includes a front-side first parallel portion 131, a rear-side second parallel portion 132, and a bent portion 133 disposed between the first parallel portion 131 and the second parallel portion 132. The first parallel portion 131 and the second parallel portion 132 are disposed parallel to one straight line L extending substantially in the front-rear direction. To be more specific, the first parallel portion 131 and the second parallel portion 132 are disposed on the same straight line L as viewed from above and extend substantially in the front-rear direction. The bent portion 133 is so bent laterally as to swerve off the straight line L. To be more specific, the bent portion 133 includes a front portion 133A so bent in a substantially U-shaped configuration as to protrude from the straight line L to the right side, and a rear portion 133B so bent in a substantially U-shaped configuration as to protrude from the straight line L to the left side. As the rear end of the front portion 133A and the front end of the rear portion 133B are joined to form a laterally extending straight line, the bent portion 133 is configured to have a substantially S-shaped configuration as a whole.

The plastic member 300 includes a third longitudinal wire covering portion 325 as part of the wire covering portion 320, with which the third longitudinal wire 130 is covered. The third longitudinal wire covering portion 325 has a bead-shaped configuration which protrudes upward with respect to the base portion 310 and the mount portion 330, and includes a bent portion covering portion 326 with which the bent portion 133 is covered. The plastic member 300 also includes a thick portion 317 having a thickness greater than a surrounding portion. The thick portion 317 is formed, like the third longitudinal wire covering portion 325, to have a bead-shaped configuration which protrudes upward with respect to the surrounding portion. The thick portion 317 includes a first thick portion 317A and a second thick portion 317B. The first thick portion 317A is configured to have a substantially L-shaped configuration connecting two ends of a front-side opening 326A formed by the bent portion covering portion 326 which are an end closer to the first parallel portion 131 and an end closer to the second parallel portion 132. The second thick portion 317B is configured to have a substantially L-shaped configuration connecting ends of a rear-side opening 326B formed by the bent portion covering portion 326 which are an end closer to the first parallel portion 131 and an end closer to the second parallel portion 132. With this configuration, a thick portion having a substantially rectangular closed outline shape is formed by the front-side portion of the bent portion covering portion 326 and the first thick portion 317A, as well as the rear-side portion of the bent portion covering portion 326 and the second thick portion 317B; therefore, in comparison with an alternative configuration in which no such thick portion 317 is provided, the rigidity of the plastic member 300 can be enhanced. Accordingly, the rigidity of the support member can be enhanced.

Figure 15:
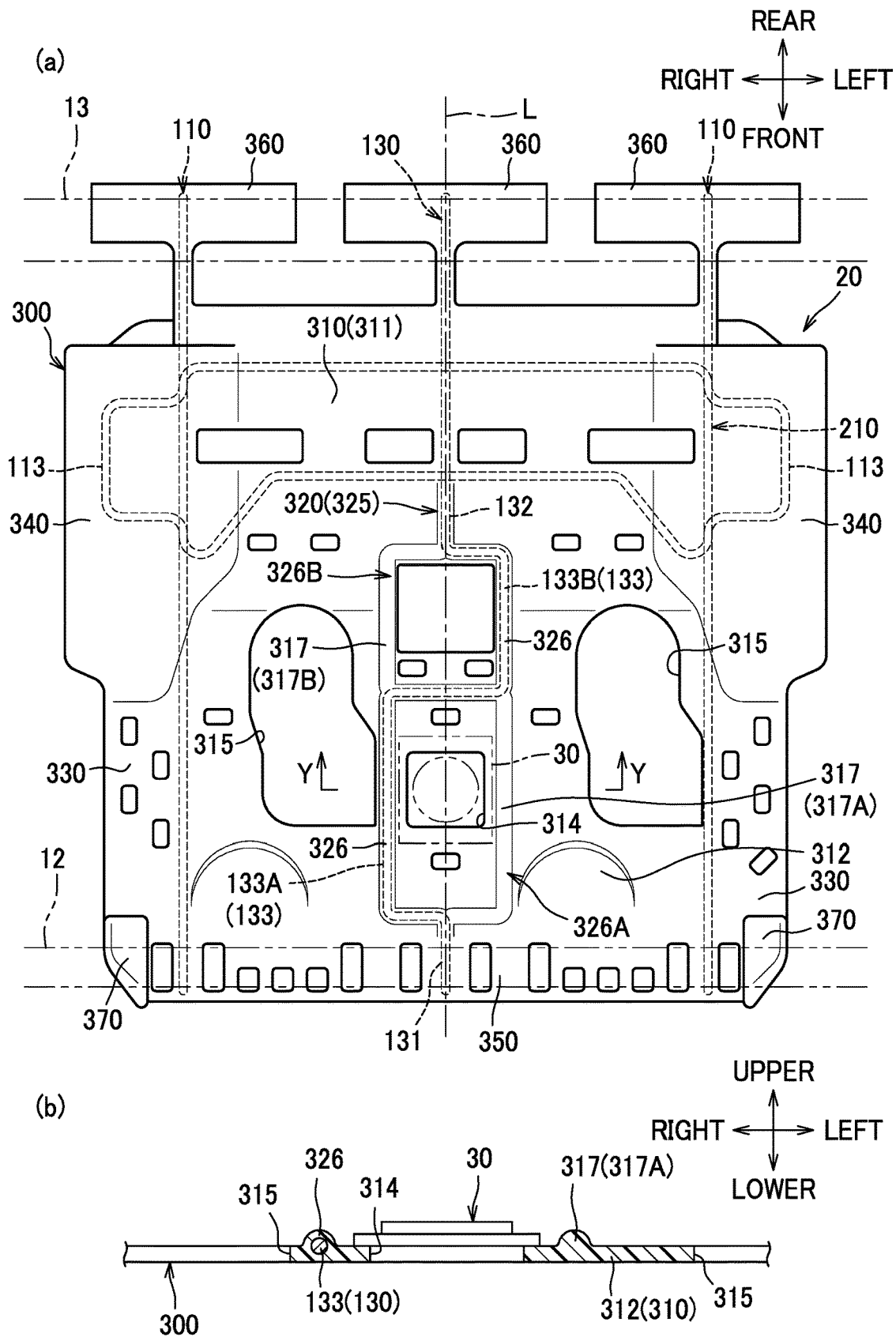
FIG. 15 includes: (a) a top view of a support member according to a modified example; and (b) a sectional view taken along the line Y-Y of the drawing figure (a).

In the embodiment shown in FIG. 15, the seating sensor 30 is disposed inside the area surrounded by the front-side portion of the bent portion covering portion 326 and the first thick portion 317A. With this arrangement, the seating sensor 30 is located inside the high-rigidity portion of the plastic member 300 reinforced by the third longitudinal wire 130 and the thick portion 317; therefore, the rigidity in the attachment structure of the seating sensor 30 can be increased. Although the above description refers to the bead-shaped thick portion 317 as an example of a thick portion, this may not be an essential feature. In other words, the thick portion may have any shape without limitation as long as the thickness is greater than the surrounding portion. Although FIG. 15 shows a particular configuration in which the third longitudinal wire 130 as an example of a bridging wire includes a first parallel portion 131, a second parallel portion 132 and a bent portion 133, this may not be an essential feature. For example, the reinforcing wire may include a first parallel portion, a second parallel portion and a bent portion, and/or the both of the bridging wire and the reinforcing wire may include a first parallel portion, a second parallel portion and a bent portion.

In the above-described embodiment, each of the left and right first longitudinal wires 110 is illustrated to include one bent portion 113, but this is not a required limitation; rather, a plurality of bent portions may be provided for each.

In the above-described embodiment, part of the first wire portion 211 as an example of a first reinforcing wire is illustrated as being located on the rear side with respect to the sciatic positions SP, but is not necessarily so, and may alternatively be located on the front side with respect to the sciatic positions SP. Also, the first wire portion 211 may be located in its entirety on the front side or on the rear side with respect to the sciatic positions SP.

In the above-described embodiment, the first transverse wire 210 is illustrated as a single wire including a first wire portion 211 and a first support portions 212 as an example of a first reinforcing wire, and two second wire portions 213 as an example of a second reinforcing wire, but this is not an essential configuration. For example, a wire constituting a first wire portion 211 and first support portions 212 as a first reinforcing wire and two wires constituting two second wire portions 213 respectively as a second reinforcing wire may be provided as separate parts. If the wire constituting the first reinforcing wire and the wire constituting the second reinforcing wire are provided as separate parts, the second reinforcing wire may not be made up of two wires but may be a single wire. It is to be understood that a single-wire configuration for the first reinforcing wire and the second reinforcing wire may serve to reduce the number of wires, and by extension can reduce the number of parts in the car seat S, in comparison with an alternative configuration in which the first reinforcing wire and the second reinforcing wire are provided as different parts.

In the above-described embodiment, each first support portion 212 is configured to extend along the front and rear extension portions 111, 112 in the front-rear direction, and located under the front and rear extension portions 111, 112 to support the extension portions 111, 112 from below, but this is not an essential arrangement. For example, the first support portion may be configured to extend in the lateral direction and to cross under one of the front extension portion 111 and the rear extension portion 112 to support the one of the extension portions from below. Furthermore, the first reinforcing wire may not include a first support portion.

In the above-described embodiment, the second transverse wire 220 as a reinforcing wire is illustrated to include a center portion 221 (second portion) and a first intermediate portion 222 (third portion), wherein the first intermediate portion 222 is nonparallel to the front inclined portion 124 (first portion) of the second longitudinal wire 120 (bridging wire), but this is not an essential configuration. For example, the bridging wire instead of the reinforcing wire may be configured to include the second portion and the third portion wherein the third portion of the bridging wire may be nonparallel to the first portion of the reinforcing wire. In this alternative configuration, the plastic member may preferably be configured to include a first covering portion with which the first portion of the reinforcing wire is covered, a second covering portion with which the third portion of the bridging wire is covered, and a connecting portion by which the first covering portion and the second covering portion are connected, in order to increase the rigidity of the support member.

In the above-described embodiment, the bridging wires 100 and the reinforcing wires 200 are entirely covered with the plastic member 300, but may not necessarily so, and may be partly exposed to outside. For example, the bridging wires 100 and the reinforcing wires 200 may be so arranged as to be spaced apart from, thus kept out of contact with each other, and connected together by being covered with the plastic member at their crossovers only, while the other portions such as bent portions 113 may be left uncovered with the plastic member.

In the above-described embodiment, the wire covering portion 320 are configured to protrude upward, that is, to be disposed on the occupant side, but may not necessarily so, and may, for example, be configured to protrude downward, that is, to be disposed on the side opposite to the occupant side. Alternatively, the wire covering portion 320 may be configured to protrude upward and downward both.

In the present embodiment, the description has been given on the premise that the frame contact portion 370 of the support member 20 and the position restriction surface 14A of the pan frame 14 are arranged to come in direct contact with each other, but this is not an essential configuration. For example, referring to FIG. 11, rubber, felt or the like may be disposed on either one of the contact surface 371 of the frame contact portion 370 and the position restriction surface 14A, so that the frame contact portion 370 and the position restriction surface 14A are configured to come in contact with each other through the rubber, felt or the like. With this configuration, noises and impact upon contact of the contact surface 371 and the position restriction surface 14A can be reduced.

In the above-described embodiment, the frame contact portion 370 is provided to protrude upward beyond the front hook portion 350, but this is not an essential feature; for example, the frame contact portion protruding upward may not be provided in the plastic member, and the laterally outer side surfaces of the front hook portions may be configured to serve as a frame contact portion. In the above-described embodiment, the position restriction surface 14A and the frame contact portion 370 are provided on the front sides of the cushion frame F1 and the support member 20, but may not necessarily so, and may be provided on the rear side thereof, for example. Moreover, the position restriction surfaces and the contact surfaces may be surfaces substantially perpendicular to the lateral direction. Furthermore, the frame including the position restriction surface and the frame on which the support member is hooked may be one and the same member.

In the above-described embodiment, the blower 40 is provided with its front-side portion attached to the support member 20 through the bracket 60 and its rear-side portion attached directly to the support member, but this is not an essential configuration. For example, the blower as a whole may be attached to the bracket, and attached through the bracket to the support member. Alternatively, the blower as a whole may be attached directly to the support member.

In the above-described embodiment, the blower 40 is disposed under the inclined portion 312, but may not necessarily so; for example, referring to FIG. 14, the blower may be disposed under the horizontal portion 311. In the above-described embodiment, the front-side portion of the blower 40 is disposed under the front frame 12, but may not necessarily so; for example, it may be the rear-side portion as an example of part of the blower that is disposed under the rear frame 13 as another example of the first connecting frame.

In the above-described embodiment, the blower 40 is exemplified by the sirocco fan, but may not necessarily so, and may be a propeller fan, a turbo fan, or the like, for example. In the above-described embodiment, the car seat S is configured to cause air to be blown out by the operation of the blower 40, but may not necessarily so, and may be configured to cause air to be sucked in by the operation of the blower. Moreover, the blower may be a device switchable between blowing out and sucking in of air with its function of switching the direction of rotation of the impeller.

In the above-described embodiment, the frame member is exemplified by the cushion frame F1, but may not necessarily so; for example, the frame member may be a back frame that constitutes a frame of the seat back S2. To be more specific, the car seat S may be configured such that a plate-shaped support member including a bridging wire, a reinforcing wire and a plastic member is disposed inside the back frame shaped like a picture frame, wherein the configuration as in the seat cushion S1 of the above-described embodiment is applied to the seat back S2. It is to be understood that in this configuration, the front side of the support member disposed inside the back frame corresponds to "an occupant side" thereof and the rear side thereof corresponds to "a side thereof opposite to the occupant side". It is also to be understood that in this configuration, assuming that the side frames of the back frame inside which the support member is disposed are adopted as a pair of opposed frames, the upward-downward direction may be referred to as "perpendicular direction perpendicular to the opposing direction (lateral direction) of the pair of opposed frames".

The car seat S in some instances may be configured such that the upper and lower frames of the back frame shaped like a picture frame inside which the support member is disposed are adopted as a pair of opposed frames. Furthermore, the car seat S in some other instances may be configured such that the front and rear frames of the cushion frame shaped like a picture frame inside which the support member is disposed as in the above-described embodiment are adopted as a pair of opposed frames. In these instances, the left and right side frames of the back frame or cushion frame may be adopted as a connecting frame. The car seat S in some instances may be configured such that the bridging wires are slung between the rear frame 13 and the pan frame 14, for example.

In the above-described embodiment, the support member 20 is illustrated as including bridging wires 100, reinforcing wires 200 and a plastic member 300, but this is not an essential configuration. For example, feasible configurations of the support member may not include any reinforcing wires. Alternatively, other feasible configurations of the support members may include: a support member consisting of bridging wires only, a plate-shaped support member consisting of plastic only, a support member made of sheet metal, and the like, which are adoptable in certain circumstances.

In the above-described embodiment, the car seat S to be installed in an automobile is illustrated as an example of a vehicle seat, but feasible applications may not be limited thereto; for example, the vehicle seat may be a seat to be installed in a vehicle other than an automobile, such as a rail car, a ship, and an aircraft, etc.

Furthermore, any of the elements explained in relation to the above-described embodiment and modified examples may be implemented in combination as desired.

What is claimed is:

1. A vehicle seat comprising:
a pair of opposed frames disposed opposite to and separately from each other in a first direction;
a pair of connecting frames disposed separately from each other in a second direction perpendicular to the first direction, the connecting frames being configured to connect the pair of opposed frames;
a bridging wire disposed to bridge the pair of connecting frames;
a reinforcing wire disposed to cross the bridging wire as viewed from an occupant side; and
a plate-shaped plastic member configured to cover the bridging wire and the reinforcing wire at least at their crossover, the plate-shaped plastic member having a portion interposed between the bridging wire and the reinforcing wire at their crossover such that the bridging wire and the reinforcing wire are arranged to be spaced apart from and thus kept out of contact with each other, the bridging wire and the reinforcing wire being connected with the plate-shaped plastic member.

2. The vehicle seat according to claim 1, wherein one of the bridging wire and the reinforcing wire comprises a second portion crossing a first portion of another of the bridging wire and the reinforcing wire, and a third portion bent from the second portion and extending toward one end of the first portion,
wherein the plastic member includes a first covering portion with which the first portion is covered, a second covering portion with which the third portion is covered, a third covering portion with which the second portion is covered, and a connecting portion by which the first covering portion and the second covering portion are connected, and
wherein the third portion is nonparallel to the first portion.

3. The vehicle seat according to claim 1, wherein the plastic member includes:
a wire covering portion with which one of the bridging wire and the reinforcing wire is covered, the wire covering portion protruding on the occupant side or a side opposite to the occupant side; and
a rib protruding on a same side as a side on which the wire covering portion protrudes, and
wherein the rib is connected to the wire covering portion.

4. The vehicle seat according to claim 1, further comprising a seating sensor for detecting seating of the occupant on the vehicle seat,
wherein the bridging wire is provided at plural positions and arranged side by side in the first direction, and
wherein the seating sensor is disposed between adjacent bridging wires.

5. The vehicle seat according to claim 1, wherein the plastic member has a mounting hole for use in mounting another member, in a position clear of a portion which covers the bridging wire or the reinforcing wire.

6. The vehicle seat according to claim 1, wherein at least one of the bridging wire and the reinforcing wire includes:
a first parallel portion and a second parallel portion each disposed parallel to one straight line; and
a bent portion disposed between the first parallel portion and the second parallel portion, the bent portion being bent so as to swerve off the straight line, and
wherein the plastic member includes a bent portion covering portion with which the bent portion is covered, and a thick portion connecting an end of the bent portion covering portion closer to the first parallel portion and an end of the bent portion covering portion closer to the second parallel portion.

7. The vehicle seat according to claim 6, further comprising a seating sensor for detecting seating of the occupant on the vehicle seat,
wherein the seating sensor is disposed inside an area surrounded by the bent portion covering portion and the thick portion.

8. The vehicle seat according to claim 1, at least one of the bridging wire and the reinforcing wire are covered in entirety with the plastic member.

9. The vehicle seat according to claim 1, further comprising a seat cushion and a seat back,
wherein the pair of opposed frames and the pair of connecting frames constitute a frame member of the seat cushion.

10. A vehicle seat, comprising:
a pair of opposed frames disposed opposite to and separately from each other in a first direction;
a pair of connecting frames disposed separately from each other in a second direction perpendicular to the first direction, the connecting frames being configured to connect the pair of opposed frames;
a bridging wire disposed to bridge the pair of connecting frames;
a reinforcing wire disposed to cross the bridging wire as viewed from an occupant side; and
a plate-shaped plastic member configured to cover the bridging wire and the reinforcing wire at least at their crossover such that the bridging wire and the reinforcing wire are arranged to be spaced apart from and thus kept out of contact with each other, the bridging wire and the reinforcing wire being connected with the plate-shaped plastic member,
wherein the plastic member includes:
a wire covering portion with which one of the bridging wire and the reinforcing wire is covered, the wire covering portion protruding on the occupant side or a side opposite to the occupant side; and
a rib protruding on a same side as a side on which the wire covering portion protrudes,
wherein the rib is connected to the wire covering portion, and
wherein the rib includes a first rib having one end connected to a portion of the wire covering portion which protrudes on the occupant side, an amount of protrusion of the first rib gradually decreasing toward another end of the first rib.

11. The vehicle seat according to claim 10, wherein at least one of the bridging wire and the reinforcing wire are covered in entirety with the plastic member.

12. The vehicle seat according to claim 10, further comprising a seat cushion and a seat back,
wherein the pair of opposed frames and the pair of connecting frames constitute a frame member of the seat cushion.

13. The vehicle seat according to claim 10, wherein one of the bridging wire and the reinforcing wire comprises:

a second portion crossing a first portion of another of the bridging wire and the reinforcing wire, and a third portion bent from the second portion and extending toward one end of the first portion, wherein the plastic member further includes:

a first covering portion with which the first portion is covered, a second covering portion with which the third portion is covered, a third covering portion with which the second portion is covered, and a connecting portion by which the first covering portion and the second covering portion are connected, and wherein the third portion is nonparallel to the first portion.

14. The vehicle seat according to claim 10, further comprising a seating sensor for detecting seating of the occupant on the vehicle seat, wherein the bridging wire is provided at plural positions and arranged side by side in the first direction, and wherein the seating sensor is disposed between adjacent bridging wires.

15. A vehicle seat, comprising:

a pair of opposed frames disposed opposite to and separately from each other in a first direction;

a pair of connecting frames disposed separately from each other in a second direction perpendicular to the first direction, the connecting frames being configured to connect the pair of opposed frames;

a bridging wire disposed to bridge the pair of connecting frames;

a reinforcing wire disposed to cross the bridging wire as viewed from an occupant side; and a plate-shaped plastic member configured to cover the bridging wire and the reinforcing wire at least at their crossover such that the bridging wire and the reinforcing wire are arranged to be spaced apart from and thus kept out of contact with each other, the bridging wire and the reinforcing wire being connected with the plate-shaped plastic member, wherein the plastic member includes:

a wire covering portion with which one of the bridging wire and the reinforcing wire is covered, the wire covering portion protruding on the occupant side or a side opposite to the occupant side; and a rib protruding on a same side as a side on which the wire covering portion protrudes, wherein the rib is connected to the wire covering portion, wherein the wire covering portion includes a bridging wire covering portion with which the bridging wire is covered, and a reinforcing wire covering portion with which the reinforcing wire is covered, and wherein the rib includes a second rib having one end connected to the bridging wire covering portion and another end connected to the reinforcing wire covering portion.

16. The vehicle seat according to claim 15, wherein at least one of the bridging wire and the reinforcing wire are covered in entirety with the plastic member.

17. The vehicle seat according to claim 15, further comprising a seat cushion and a seat back, wherein the pair of opposed frames and the pair of connecting frames constitute a frame member of the seat cushion.

18. The vehicle seat according to claim 15, wherein one of the bridging wire and the reinforcing wire comprises:

a second portion crossing a first portion of another of the bridging wire and the reinforcing wire, and a third portion bent from the second portion and extending toward one end of the first portion, wherein the plastic member further includes:

a first covering portion with which the first portion is covered, a second covering portion with which the third portion is covered, a third covering portion with which the second portion is covered, and a connecting portion by which the first covering portion and the second covering portion are connected, and wherein the third portion is nonparallel to the first portion.

19. The vehicle seat according to claim 15, further comprising a seating sensor for detecting seating of the occupant on the vehicle seat, wherein the bridging wire is provided at plural positions and arranged side by side in the first direction, and wherein the seating sensor is disposed between adjacent bridging wires.

* * * * *